(12) United States Patent
    Hill

(10) Patent No.: US 10,893,660 B2
(45) Date of Patent: Jan. 19, 2021

(54) LENGTH CONTROL SYSTEM AND METHOD

(71) Applicant: Kevin A. Hill, Los Angeles, CA (US)

(72) Inventor: Kevin A. Hill, Los Angeles, CA (US)

( * ) Notice: Subject to any disclaimer, the term of this patent is extended or adjusted under 35 U.S.C. 154(b) by 0 days.

(21) Appl. No.: 16/674,604

(22) Filed: Nov. 5, 2019

(65) Prior Publication Data
    US 2020/0060239 A1    Feb. 27, 2020

Related U.S. Application Data

(60) Continuation-in-part of application No. 15/949,580, filed on Apr. 10, 2018, now Pat. No. 10,463,022, which is a division of application No. 15/132,910, filed on Apr. 19, 2016, now Pat. No. 9,943,071.

(51) Int. Cl.
    *A01K 27/00*    (2006.01)
    *B65H 75/44*    (2006.01)

(52) U.S. Cl.
    CPC ....... *A01K 27/004* (2013.01); *B65H 75/4426* (2013.01); *B65H 2701/35* (2013.01)

(58) Field of Classification Search
    CPC .......................... A01K 37/004; B65H 75/4423
    USPC ..................................... 224/381.5; 242/381.5
    See application file for complete search history.

(56) References Cited

U.S. PATENT DOCUMENTS

| | | | | |
|---|---|---|---|---|
| 1,948,158 A | * | 2/1934 | Barr | B60S 5/04 242/381.5 |
| 2,391,141 A | * | 12/1945 | Dour | B65H 75/44 191/12.2 R |
| 2,424,368 A | * | 7/1947 | Oberdorf | A01K 1/04 242/382.4 |
| 2,776,644 A | * | 1/1957 | Fontaine | A01K 27/004 119/796 |
| 2,864,585 A | * | 12/1958 | Gschwind | A62B 1/08 242/375 |
| 2,904,282 A | * | 9/1959 | Zelnick | G01B 3/1005 242/381.5 |
| 3,088,438 A | * | 5/1963 | Oliphant | A47D 13/086 119/770 |
| 3,123,052 A | * | 3/1964 | Marshall | A01K 27/004 119/789 |
| 3,315,642 A | | 4/1967 | Rogers et al. | |
| 3,693,596 A | | 9/1972 | Croce et al. | |
| 3,853,283 A | | 12/1974 | Croce et al. | |
| 3,879,016 A | * | 4/1975 | Kankkunen | A62B 1/10 242/396 |

(Continued)

FOREIGN PATENT DOCUMENTS

| DE | 2745563 A1 | * | 4/1979 | ............... A01K 1/04 |
|---|---|---|---|---|
| DE | 2745563 A1 | | 4/1979 | |

(Continued)

*Primary Examiner* — Magdalena Topolski
*Assistant Examiner* — Morgan T Barlow
(74) *Attorney, Agent, or Firm* — Lincoln Square Legal Services, Inc.

(57) ABSTRACT

A retractable leash device (e.g., for pets, children, or the like) having a length control system for limiting the extendable length of a main line is provided. The device includes a cover plate mounted on a wind-up spool and having at least one ridged channel that interacts with a length control switch during line extension to control the extendable length of the main line while simultaneously maintaining the retractability of the main line.

15 Claims, 19 Drawing Sheets

(56) References Cited

U.S. PATENT DOCUMENTS

| | | | |
|---|---|---|---|
| 3,937,418 A * | 2/1976 | Critelli | A01K 27/004 242/384.7 |
| 4,165,713 A | 8/1979 | Brawner et al. | |
| 4,522,349 A * | 6/1985 | Clerk | A01K 89/08 242/396.7 |
| 4,685,635 A * | 8/1987 | Monsigny | B60R 22/405 242/375.1 |
| 4,748,937 A * | 6/1988 | Musetti | A01K 27/004 119/796 |
| 4,887,551 A | 12/1989 | Musetti | |
| 4,932,362 A | 6/1990 | Birchmire, III et al. | |
| 5,664,766 A | 9/1997 | Baziuk | |
| 5,733,231 A | 3/1998 | Corn et al. | |
| 5,762,029 A | 6/1998 | DuBois et al. | |
| 5,887,550 A | 3/1999 | Levine et al. | |
| 6,148,773 A | 11/2000 | Bogdahn | |
| 6,371,056 B1 | 4/2002 | Phillips | |
| 6,405,683 B1 | 6/2002 | Walter et al. | |
| 6,523,500 B1 | 2/2003 | Zenteno | |
| 6,648,261 B2 | 11/2003 | Irving | |
| 6,688,260 B2 | 2/2004 | Morrison | |
| 6,712,026 B1 | 3/2004 | Carville, Jr. | |
| 6,886,499 B2 | 5/2005 | Meissner | |
| 6,942,078 B2 | 9/2005 | Hamm et al. | |
| 7,040,257 B2 | 5/2006 | Waxman et al. | |
| 7,201,342 B2 | 4/2007 | Huang | |
| 7,234,417 B2 | 6/2007 | Laird | |
| 7,896,281 B2 | 3/2011 | Bleshoy | |
| 8,151,736 B2 | 4/2012 | Simpson et al. | |
| 8,201,964 B2 | 6/2012 | Mattheis | |
| 8,336,504 B1 | 12/2012 | Geis | |
| 8,347,824 B2 | 1/2013 | Marshall | |
| 8,474,743 B2 * | 7/2013 | Pabst | B61B 11/004 242/381 |
| 8,651,411 B2 | 2/2014 | Wang | |
| 8,978,593 B2 | 3/2015 | Catena | |
| 9,104,226 B2 | 8/2015 | Shi | |
| 9,131,663 B2 | 9/2015 | Vaccari | |
| 9,193,561 B2 | 11/2015 | Yan et al. | |
| 9,364,054 B2 | 6/2016 | Gittens et al. | |
| 9,408,438 B2 | 8/2016 | Chen | |
| 9,439,400 B2 | 9/2016 | Bogdahn et al. | |
| 10,149,035 B2 | 12/2018 | Song et al. | |
| 2003/0145803 A1 | 8/2003 | Muller | |
| 2005/0103282 A1 | 5/2005 | Huff et al. | |
| 2006/0201449 A1 | 9/2006 | DiDonato | |
| 2007/0022975 A1 | 2/2007 | Arnold | |
| 2007/0187542 A1 | 8/2007 | Ng et al. | |
| 2011/0073047 A1 | 3/2011 | Simpson et al. | |
| 2011/0079676 A1 | 4/2011 | Skowronski et al. | |
| 2011/0114032 A1 | 5/2011 | Reed | |
| 2011/0120389 A1 | 5/2011 | Yackley | |
| 2012/0137978 A1 | 6/2012 | McBounds | |
| 2012/0298784 A1 * | 11/2012 | Morgan | B65H 75/4447 242/381.5 |
| 2013/0008392 A1 | 1/2013 | Holmstrom | |
| 2013/0047936 A1 | 2/2013 | Romiluyi | |
| 2013/0284114 A1 | 10/2013 | Bizzell et al. | |
| 2014/0174377 A1 | 6/2014 | Geller | |
| 2014/0238314 A1 | 8/2014 | O'Brien et al. | |
| 2014/0263799 A1 | 9/2014 | Baerwald et al. | |
| 2016/0143253 A1 * | 5/2016 | Pawlowski | A01K 27/004 119/796 |

FOREIGN PATENT DOCUMENTS

| | | | |
|---|---|---|---|
| DE | 3040281 A1 * | 7/1982 | A01K 27/004 |
| DE | 3040281 A1 | 7/1982 | |
| EP | 1489901 A4 | 4/2005 | |
| JP | 2011126712 A | 6/2011 | |
| WO | 2001052635 A1 | 7/2001 | |
| WO | 2004105468 A2 | 12/2004 | |
| WO | 2011058588 A1 | 5/2011 | |

* cited by examiner

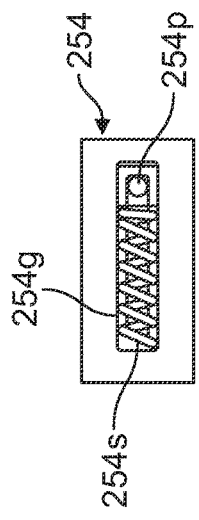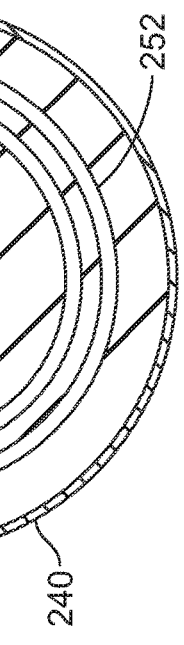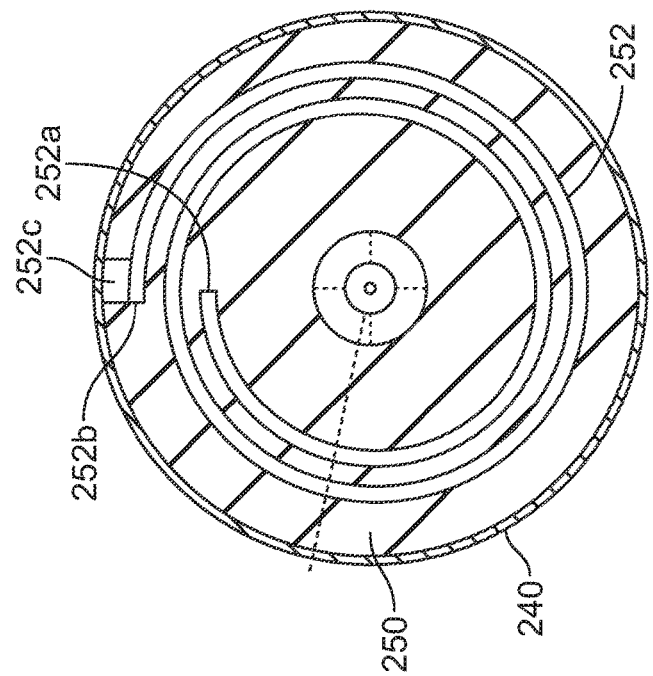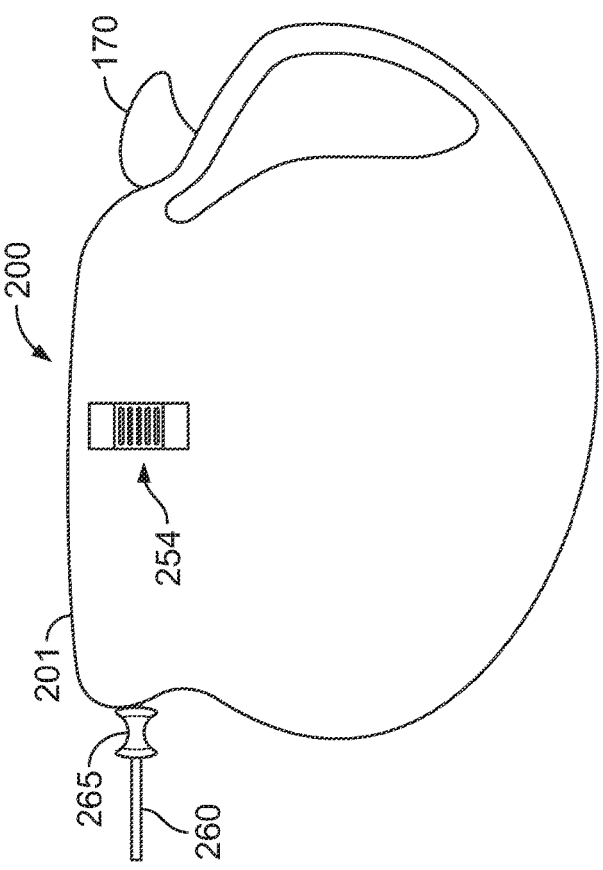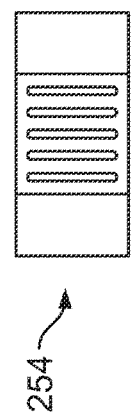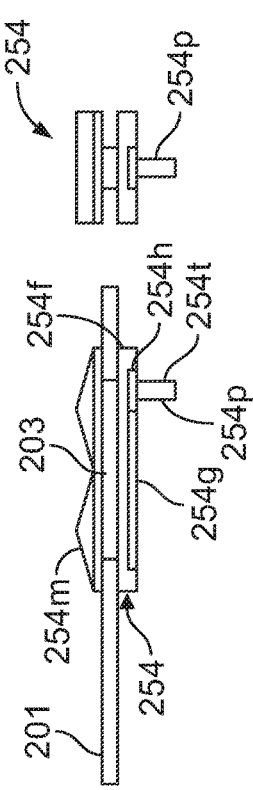

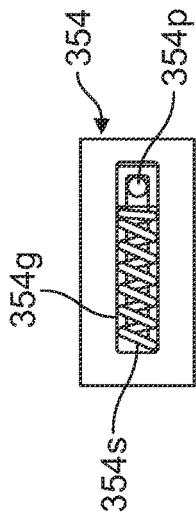
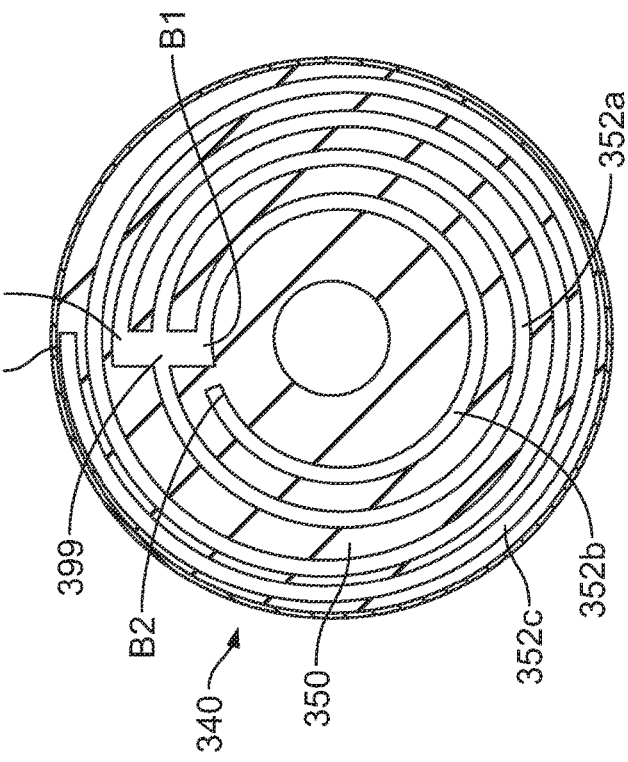
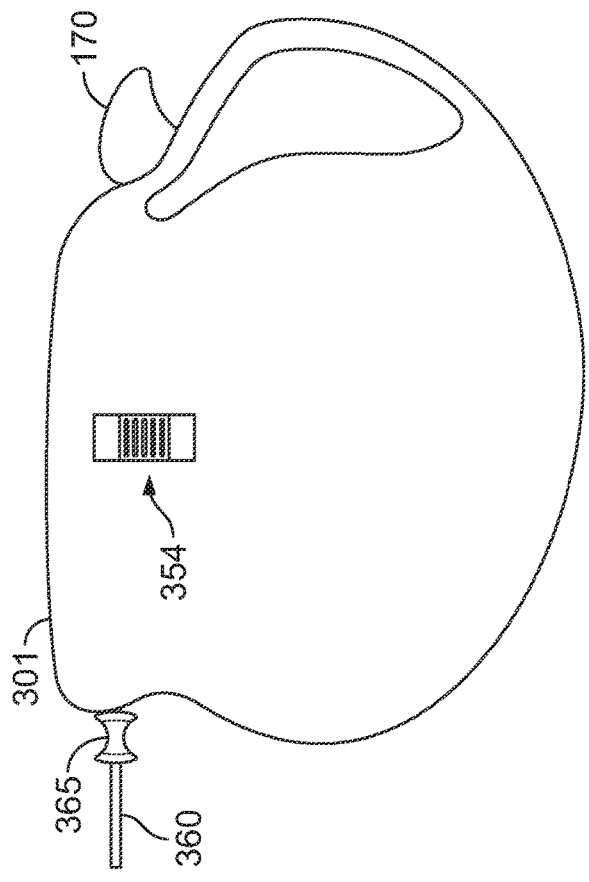
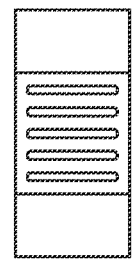
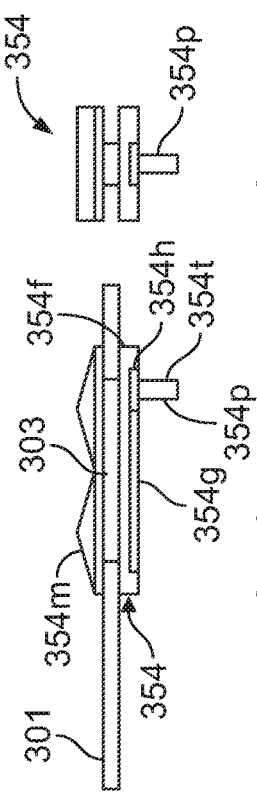
FIG. 9A
FIG. 9B
FIG. 9C
FIG. 9D
FIG. 9E
FIG. 9F

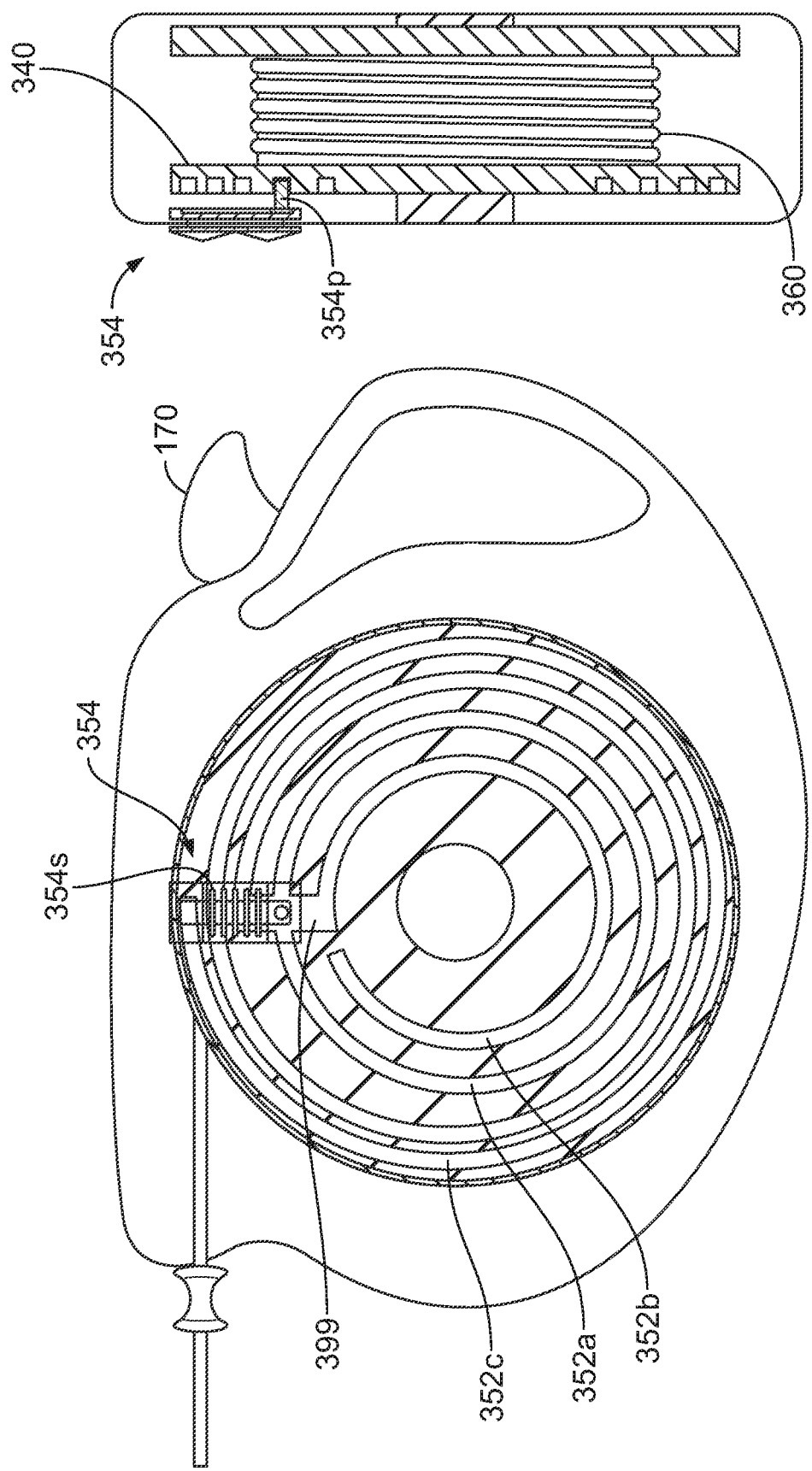

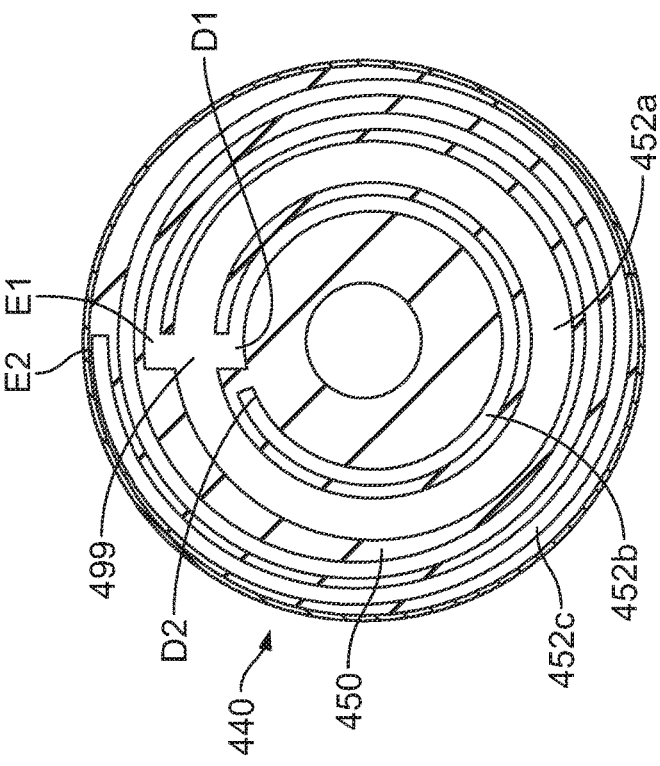
FIG. 13A
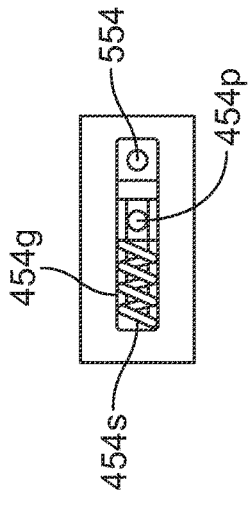
FIG. 13B
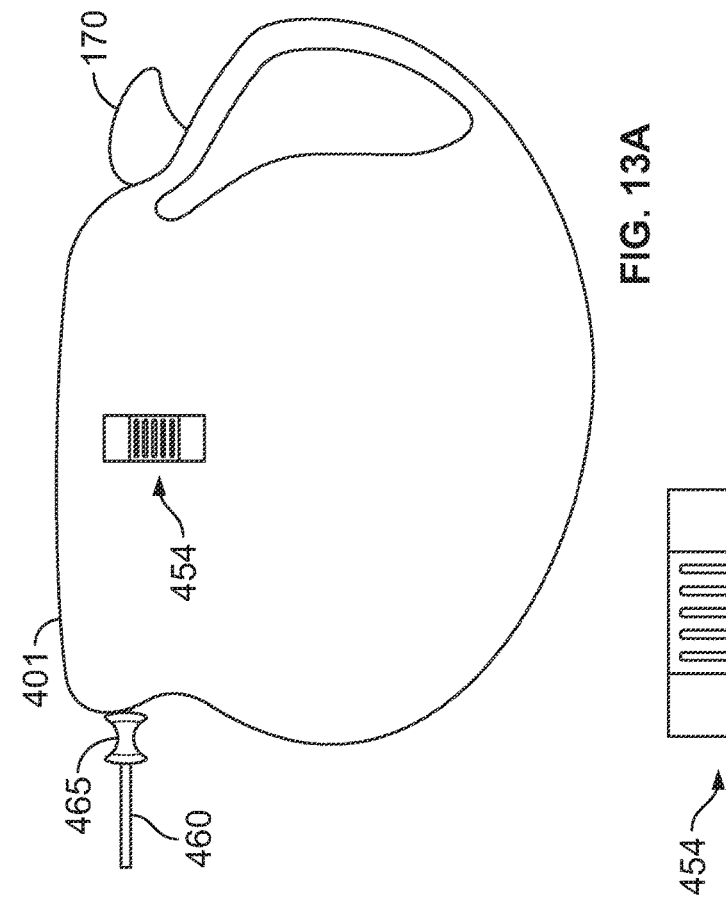
FIG. 13F
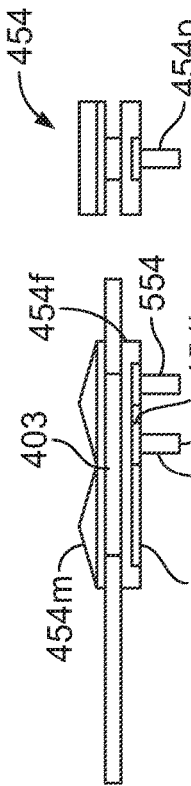
FIG. 13C
FIG. 13D
FIG. 13E

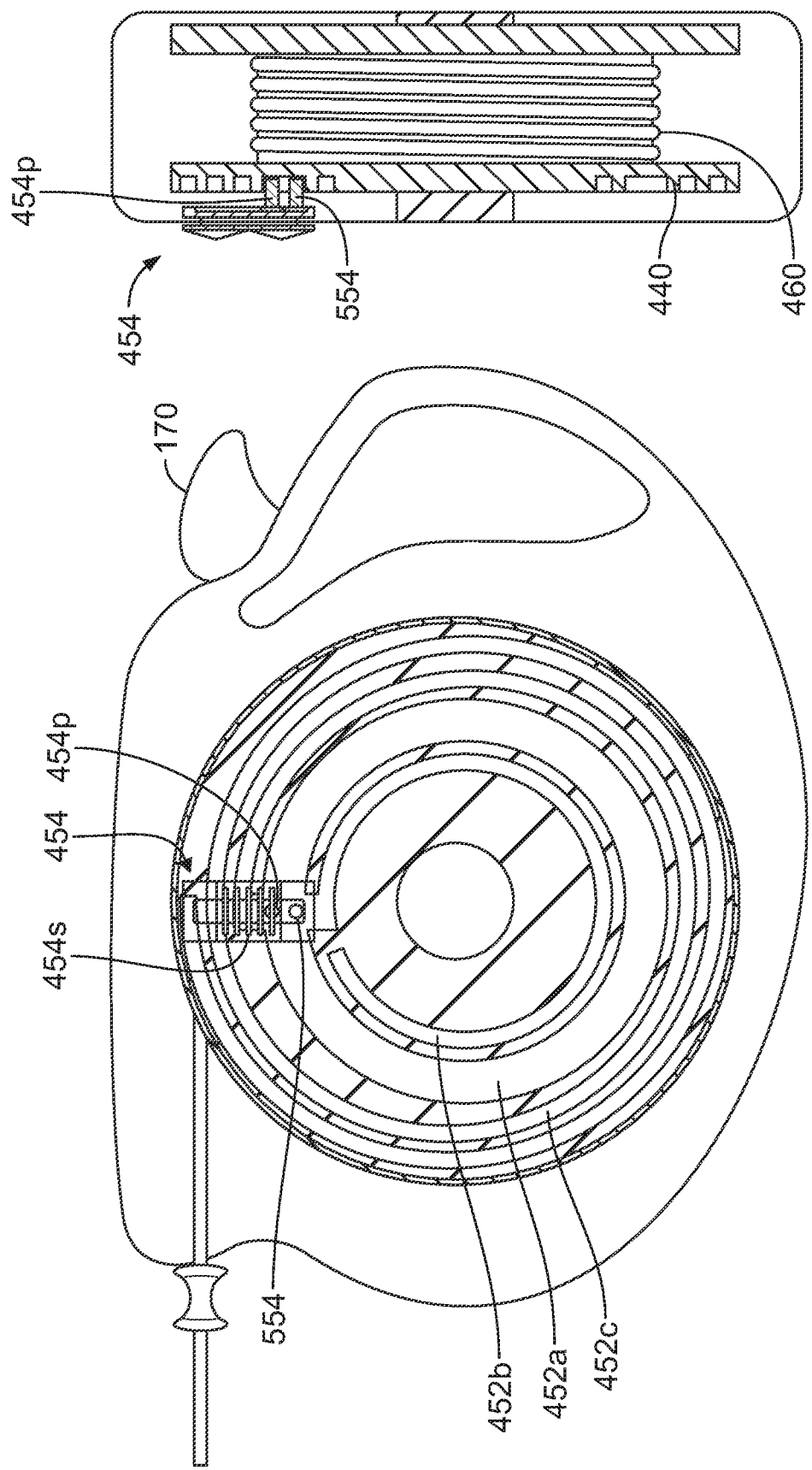

LENGTH CONTROL SYSTEM AND METHOD

CROSS-REFERENCE TO RELATED APPLICATIONS

This application is a continuation-in-part application of U.S. patent application Ser. No. 15/949,580, filed Apr. 10, 2018, which is a divisional application of U.S. patent application Ser. No. 15/132,910, filed Apr. 19, 2016, now U.S. Pat. No. 9,943,071.

FIELD OF TECHNOLOGY

The present technology relates to length control systems, and more particularly, to retractable leash devices (e.g., for pets, children, or the like) in which the extendable length of a line therein is shortened without affecting its retractability.

BACKGROUND

The retractable nature of conventional leashes benefits the user by eliminating the excess line that can accumulate when the distance between the user and the leashed being (e.g., pet) varies. These devices feature a housing with a handle portion that encloses a wind-up spool biased to retract an attached fixed length of line. The wind-up spool extends out line when pulled and retracts the line when tension is lessened. The maximum travel of the line in current devices can be limited by the user in two ways: (1) by fully extending the line on the wind-up spool, thus reaching the maximum length of the leash; and (2) by employing a manually actuated brake mechanism, which locks and fixes the wind-up spool to a set length the user desires. A locking mechanism on the brake allows the user to lock in place the wind-up spool without the user having to apply constant pressure to the brake mechanism.

Improvements to retractable leashes are desirable, one benefit of the present technology is to provide a new and improved retractable leash. Conventionally, if a user desires to shorten the length of the retractable leash, the user typically employs a manually actuated brake that can be either locked or held in place manually by applying constant pressure. Shortening the length of the leash is beneficial in situations where the user desires the pet or other animal or object connected to the leash to remain closer so that the user has more control. Shortening the leash can be beneficial when the user is in an area with potential hazards, such as vehicle or bicycle traffic, steep drop-offs or cliffs, other animals or people nearby, and other potential dangers. Shortening the leash by means of the brake mechanism, however, freezes the wind-up spool and eliminates the retractable nature of the device, which can result in the accumulation of excess line in the leash when the distance between the user and the pet is lessened, thereby negating the benefit of the device itself. The accumulated excess line caused by this situation can be dangerous, potentially presenting a tripping hazard to the user, the pet, or nearby pedestrians. The accumulated line can also become tangled in the pet's feet, forcing the user to halt his or her activity to untangle the line. Thus, a need exists for a leash in which a user can have more control over its length, for ease of use.

SUMMARY OF THE TECHNOLOGY

In various embodiments, the present technology is directed to: (1) length control systems; (2) retractable leash devices in which a length control system is enclosed in a housing; and (3) methods for restricting the movement of a human or animal using a length control system. In certain embodiments, the length control system comprises a spool with two opposing parallel surfaces, a center portion joining the two surfaces; an extendable and retractable main line coiled around the center portion of the spool; a channel defined on one of the two spool surfaces or on a cover plate affixed to one of the two spool surfaces; and a switch configured to interact with the channel to restrict the extension but not the retraction of the main line. In some embodiments this length control system can be enclosed in a housing to form a retractable leash device. This retractable leash device can be used in the claimed methods to restrict the distance that a leashed being can travel from the leash holder without restricting the retractability of the leash's main line.

In certain embodiments, the present technology is directed to a length control system comprising: a spool comprising (i) two opposing surfaces, substantially parallel to each other and rotatable around an axis, and (ii) a center portion joining the two surfaces; a main line coiled around the center portion of the spool and extendable and retractable; a channel defined on one of the two surfaces, the channel comprising an entry portion and a spiral portion; a spring having a first end attached to the center portion of the spool and a second end opposite the first end and disposed along a portion of the length of the channel; a perimeter path encompassing the space between the outermost edge of the spiral and the periphery of the spool and disposed concentrically within the spool; and a pin movable to selectively engage and move within the perimeter path, causing the spring to stretch. In certain embodiments, the second end of the spring contacts the perimeter path, such that the pin can advance along the perimeter path to a point where the pin contacts the second end of the spring, thereby stretching the spring until the spring tightens to a maximum length, at which point the spring comes to a stop. In certain embodiments, the second end of the spring is connected to a clip located in the perimeter path, the clip configured to engage the pin such that movement of the pin advances the clip along the perimeter path, thereby stretching the spring until the spring tightens to a maximum length, at which point the pin and spring come to a stop.

In certain embodiments, the present technology is directed to a length control system comprising a spool comprising (i) two opposing surfaces, substantially parallel to each other and rotatable around an axis, and (ii) a center portion joining the two surfaces; a cover plate mounted to one of the two surfaces of the spool; a main line coiled around the center portion of the spool and extendable and retractable; a channel defined on the cover plate, the channel comprising an entry portion and a spiral portion; a spring having a first end attached to the center portion of the spool and a second end opposite the first end and disposed along a portion of the length of the channel; a perimeter path encompassing the space between the outermost edge of the spiral and the periphery of the spool and disposed concentrically within the spool; and a pin movable to selectively engage and move within the perimeter path, causing the spring to stretch. In certain embodiments, the second end of the spring contacts the perimeter path, such that the pin can advance along the perimeter path to a point where the pin contacts the second end of the spring, thereby stretching the spring until the spring tightens to a maximum length, at which point the spring comes to a stop. In certain embodiments, the second end of the spring is connected to a clip located in the perimeter path, the clip configured to engage the pin such that movement of the pin advances the clip along the perimeter path, thereby stretching the spring until the spring tightens to a maximum length, at which point the pin and spring come to a stop.

In certain embodiments, the present technology is directed to a retractable leash device, comprising: a housing; and a length control system enclosed within the housing, the length control system comprising a spool comprising (i) two surfaces, substantially parallel to each other and rotatable around an axis, and (ii) a center portion joining the two surfaces; a main line coiled around the center portion of the spool and extendable and retractable; a channel defined on one of the two surfaces or on a cover plate mounted on one of the two surfaces, the channel comprising an entry portion and a spiral portion; a spring having a first end attached to the center portion of the spool and a second end opposite the first end of the spring and disposed along a portion of the length of the channel; a perimeter path encompassing the space between the outermost edge of the spiral and the periphery of the spool and disposed concentrically within the spool; and a pin movable to selectively engage and move within the perimeter path, causing the spring to stretch.

In certain embodiments, the present technology is directed to methods of restricting the movement of a human or animal comprising the steps of: attaching a leash device containing a leash control system, described herein, to the human or animal; and engaging the switch in the channel to select a predetermined maximum length of the main line.

BRIEF DESCRIPTION OF THE DRAWINGS

The present technology is discussed in greater detail below with reference to exemplary embodiments illustrated in the accompanying drawings, in which:

FIG. 3a is a side view of a retractable leash device, in accordance with various embodiments of the present technology;

FIG. 3b is a top view of a switch of a retractable leash device, in accordance with various embodiments of the present technology;

FIGS. 3c and 3d are side views of a switch, in accordance with various embodiments of the present technology;

FIG. 3e is a bottom view of a switch, in accordance with various embodiments of the present technology;

FIG. 3f is a plan view of a side surface of a wind-up spool of a retractable leash device, in accordance with various embodiments of the present technology;

FIGS. 4a-8b illustrate the progressing interaction between a switch and a channel during extension and retraction of a main line, in accordance with various embodiments of the present technology;

FIG. 9a is a side view of a retractable leash device, in accordance with various embodiments of the present technology, FIG. 9b is a top view of a switch of a retractable leash device, in accordance with various embodiments of the present technology;

FIGS. 9c and 9d are side views of a switch, in accordance with various embodiments of the present technology;

FIG. 9e is a bottom view of a switch, in accordance with various embodiments of the present technology;

FIG. 9f is a plan view of a side surface of a wind-up spool of the retractable leash device, in accordance with various embodiments of the present technology;

FIGS. 10a-12b illustrate a switch in various positions with respect to various channels of a retractable leash device, in accordance with various embodiments of the present technology;

FIG. 13a is a side view of a retractable leash device, in accordance with various embodiments of the present technology;

FIG. 13b is a top view of a switch of a retractable leash device, in accordance with various embodiments of the present technology;

FIGS. 13c and 13d are side views of a switch, in accordance with various embodiments of the present technology;

FIG. 13e is a bottom view of a switch, in accordance with various embodiments of the present technology;

FIG. 13f is a plan view of a side surface of a wind-up spool of the retractable leash device, in accordance with various embodiments of the present technology; and FIGS. 14a-16b illustrate a switch in various positions with respect to various channels of a retractable leash device, in accordance with various embodiments of the present technology.

DETAILED DESCRIPTION

Figure 1:
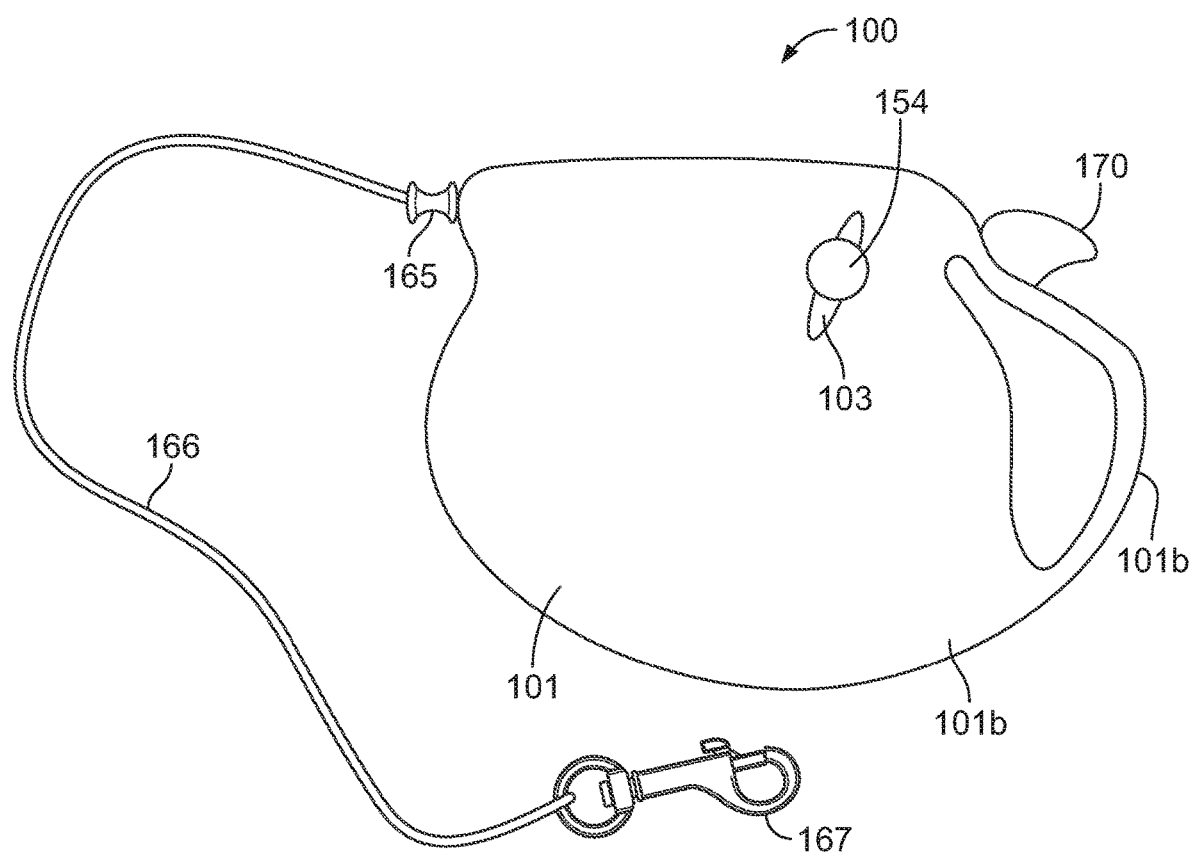
FIG. 1 is a perspective view of a retractable leash device having a main line, in accordance with various embodiments of the present technology.
Figure 2A:
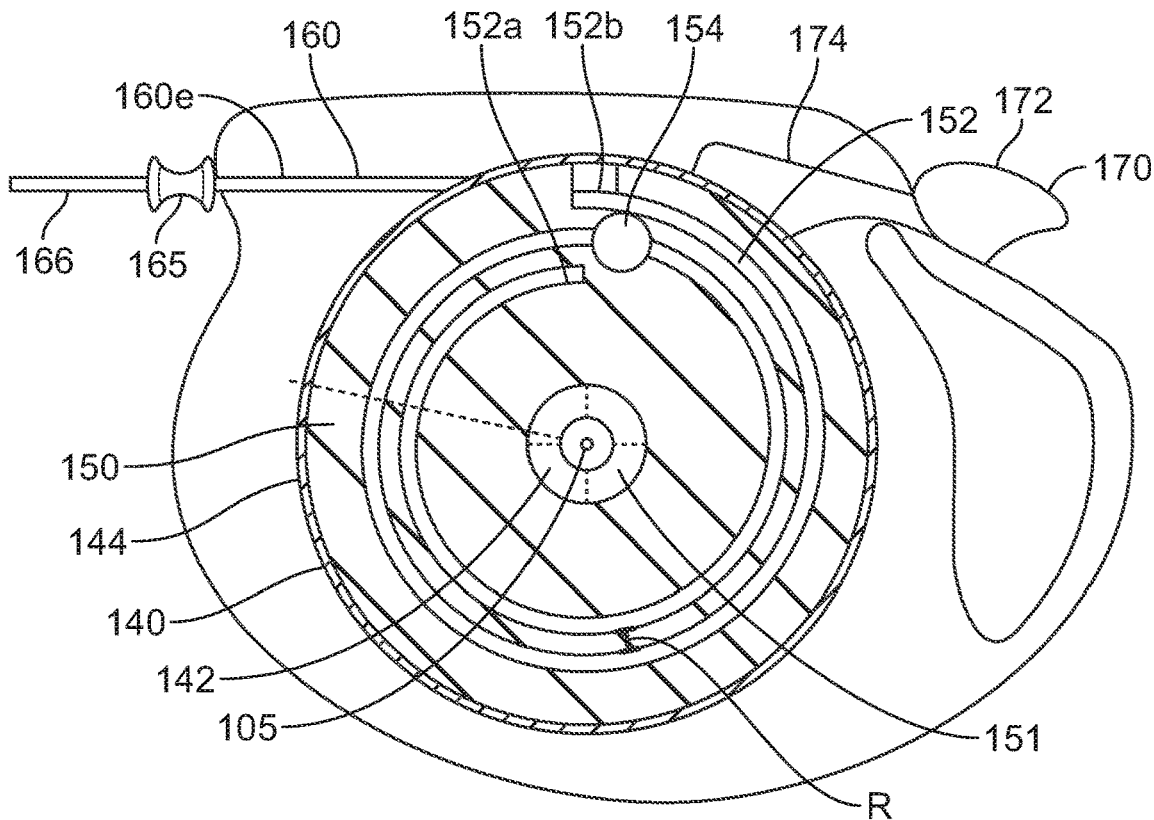
FIGS. 2a and 2b are plan views of a retractable leash device in a partially disassembled state, illustrating a switch in different positions of a channel of the device, in accordance with various embodiments of the present technology.
Figure 2B:
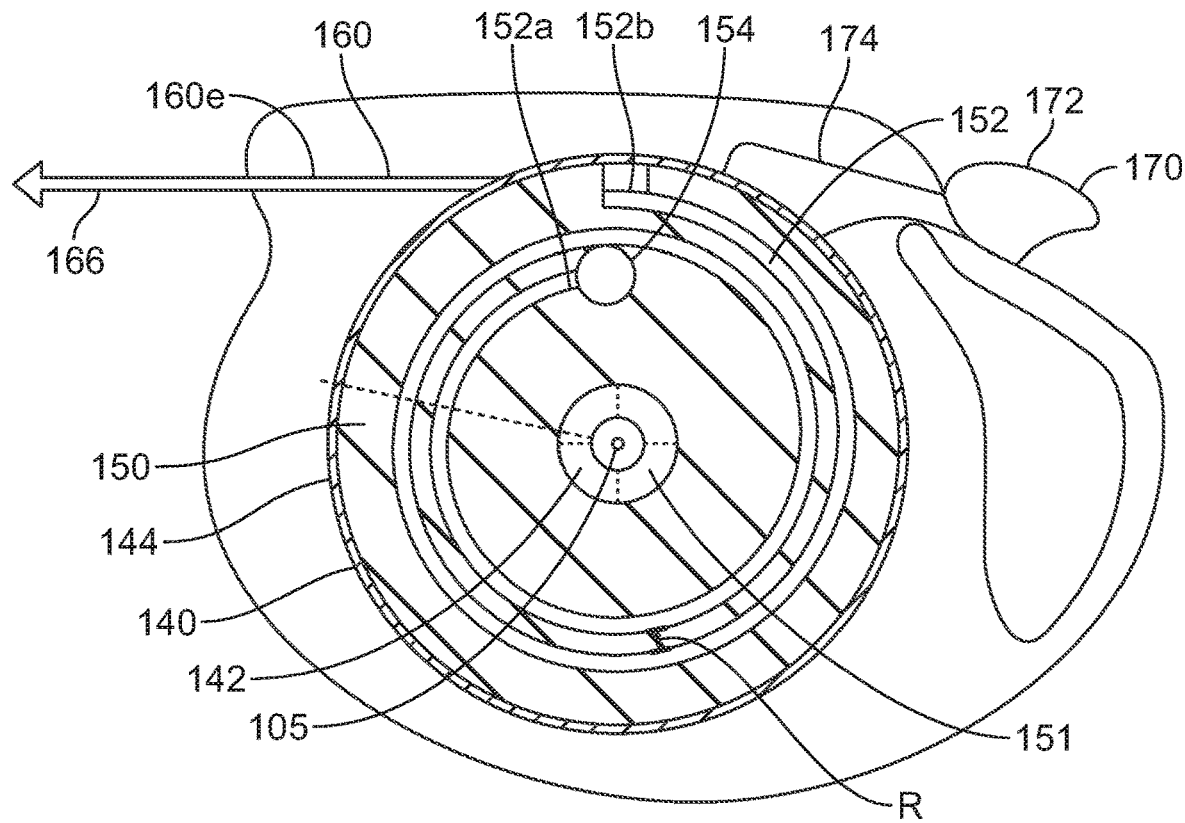

As used herein, the term "leash" refers to any device having a length, such as a strap or cord, that can be used to restrain a human or animal, including but not limited to a pet or a child. As used herein, the term "retractable" means having a length that can be moved away from, or towards, a stationary point in a manner that adjusts the distance between the stationary point and a point along the length. FIG. 1 is a perspective view of a retractable leash device 100 in accordance with various embodiments of the present technology. FIGS. 2a and 2b are views of retractable leash device 100 in a partially disassembled state, illustrating a switch 154 in different positions of a channel 152 of the device, in accordance with various embodiments of the present technology. Retractable leash 100 can include a housing 101 composed of opposite housing sides that, when coupled to one another, form a wind-up spool enclosure portion 101a and a handle portion 101b. The housing sides can be secured to one another by conventional means, e.g., via one or more screws or snaps. The second housing side can include one or more holes on an inner face thereof that align with one or more corresponding holes on an inner face of the first housing side for attachment by screws. One or more of the holes of the second housing side can include threads for coupling to corresponding threads of screws, or vice versa.

Referring to FIGS. 1, 2a, and 2b, a wind-up spool 140 can be mounted, via a center hole 142, to a column 105 protruding from the inner face of the second housing side. A main line 160 can have an end 160e, and can be coiled about wind-up spool 140. End 160e can be coupled to a connector 165, which can, in turn, be coupled to an extension line 166 (e.g., for connecting to a collar, harness, or other restraining system for a subject, e.g., an animal, such as a pet or the like) via a link 167. Connector 165 can serve as a stopper that prevents end 160e of main line 160 from retracting into housing 101. Retractable leash 100 can also include a spring or spring-like mechanism (not visible in the drawing figures) that provides a constant recoil force for retracting main line 160 whenever it is extended from wind-up spool 140.

Retractable leash 100 can also include an optional brake mechanism 170 having a manually actuated brake switch 172 and brake leg 174. When actuated, brake leg 174 can provide frictional forces upon contact thereof with portions of wind-up spool 140 (e.g., with side surfaces of wind-up spool 140, such as side surface 144), which can prevent retraction and extension of main line 160.

To maintain the retractability of main line 160, while simultaneously limiting the extendable length thereof, retractable leash device 100 can advantageously include a length control system. In various embodiments, the length control system can include a channel 152 and a switch 154 that interacts with channel 152. As used herein, "interacts with" means that a portion or all of the switch contacts a portion of the channel in a manner that is secure but also can slide freely along the length of the channel upon application of mechanical force. Channel 152 can be defined in a cover plate 150 that is mounted to side plate 144 of wind-up spool 140. Channel 152 (which can be, e.g., a ridged channel) can be defined as a spiral-like curve that extends concentrically outward from an inner channel end 152a (disposed in a region adjacent the center hole) to an outer channel end 152b (disposed in a region proximate the periphery of cover plate 150). In various embodiments, portions of the curve can be equidistant from one another (e.g., by a distance R), or of varying distances from each other, as it spirals from end to end. Cover plate 150 can be made of any suitable material (e.g., metal, plastic, or the like), and can be mounted in any suitable manner (e.g., via an adhesive, with one or more clips crews or snaps, or the like). Cover plate 150 can conform to the circular shape of side plate 144, and can include a center hole 151 that aligns with center hole 142 of wind-up spool 140 for mounting to column 105. However, cover plate 150 can alternatively not include a center hole. For example, in some embodiments, the depth of wind-up spool 140 can span the entirety of (or even exceed) the height of column 105, in which case, there is no need for cover plate 150 to have a center hole.

Switch 154 (which can, e.g., be a pin, a nail, or the like) can include a head and a post. The post can be constructed to pass through a length control slot 103 on the first housing side, which can be positioned to externally expose portions of channel 152. When the post is inserted through slot 103 and into channel 152, any extension or retraction of main line 160 can cause wind-up spool 140 and cover plate 150 to rotate, and thus channel 152 to also rotate with respect to the post. In the case of main line extension, channel 152 can traverse the post from channel end 152b to channel end 152a. Put another way, the post can traverse channel 152 from channel end 152b to channel end 152a. Conversely, in the case of main line retraction, the post can, for example, traverse channel 152 from channel end 152a to channel end 152b. As illustrated FIGS. 1, 2a, and 2b, switch 154 can assume different positions in channel 152 (and can move in a generally downward direction in length control slot 103), when main line 160 is extended from housing 101. When switch 154 reaches channel end 152a, movement of wind-up spool 140 may be halted, effectively limiting the maximum extendable length of main line 160. Having cover plate 150 disposed over side plate 144 of wind-up spool 140 can advantageously restrict switch 154 to interact only with channel 152. Side plate 144 can thus serve as a barrier between the switch's post and main line 160, effectively preventing switch 154 from contacting and/or interfering with extension and retraction of main line 160 during use of retractable leash device 100.

The width of channel 152 can be defined such that it is large enough to receive and guide the post of switch 154. Additionally, the width of channel 152 can be uniform throughout its entire length. However, the width may vary, and may assume different shapes. In various embodiments, channel 152 can also be smooth, such that the switch's post travels therein in unimpeded or with minimal frictional forces against the sides of the channel.

While switch 154 can limit the amount of main line 160 that can be extended from wind-up spool 140, it does not restrict or interfere with the retractability of main line 160 when it is released from an extended state. This is because, as the switch's post traverses in a direction from outer channel end 152b to inner channel end 152a during main line extension (that is, as wind-up spool 140 rotates from a position in which the post contacts outer channel end 152b to a position in which the post contacts inner channel end 152a), the post is free to conversely traverse in a direction from inner channel end 152a to outer channel end 152b when main line 160 is subsequently released.

The amount of length of main line 160 that is permitted to extend from housing 101 can be at least partially controlled by the rotational position of cover plate 150 with respect to wind-up spool 140. For example, cover plate 150 can be rotationally positioned with respect to wind-up spool 140 such that, when main line 160 is fully retracted and connector 165 abuts (or is disposed proximate to) the slot through which main line 160 extends, the post of switch 154 abuts (or is disposed proximate to) channel end 152b. In this configuration, main line 160 can be allowed to extend by a length approximately equal to the length of ridged channel 152 from channel end 152b to channel end 152a.

Alternatively, cover plate 150 can instead be rotationally positioned with respect to wind-up spool 140 such that, when main line 160 is fully retracted, the post of switch 154 is disposed at a distance from channel end 152b. Here, main line 160 can be allowed to extend by a length shorter than the length of channel 152 (from channel end 152b to the channel end 152a), since the length of channel 152 that switch 154 can traverse during extension of main line 160 is shorter. In this way, depending on how wind-up spool 140 or cover plate 150 is oriented during manufacture, the preset extendable length of main line 160 provided by channel 152 can be different from the length of channel 152 itself.

In some embodiments, rather than being defined on cover plate 150, channel 152 can be defined directly onto side plate 144 of spool 140, rendering a cover plate, such as cover plate 150, unnecessary. In these embodiments, wind-up spool 140 and cover plate 150 can, in effect, comprise a single component. In these embodiments side plate 144 may be thicker, and its channel may not be defined through the entire thickness of the side plate, which can avoid the post of switch 154 contacting with main line 160, disposed on the opposite side of the side plate.

FIG. 3a is a side view of an alternate retractable leash device 200, in accordance with various embodiments of the present technology. FIG. 3b is a top view of a switch 254 of exemplary leash device 200. FIGS. 3c and 3d are side views of switch 254. FIG. 3e is a bottom view of switch 254. FIG. 3f is a plan view of a side surface 250 of a wind-up spool 240 of exemplary leash device 200.

Exemplary leash device 200 can include a housing 201 having opposite housing sides, a wind-up spool 240, a main line 260, and a connector 265. In various embodiments, the length control system can include a channel 252 and a switch 254. Switch 254 can be, for example, a manual switch mechanism that a user can displace by moving or flipping in certain directions.

Referring to FIG. 3f, in certain embodiments, channel 252 can be defined in a side surface 250 of wind-up spool 240. However, in certain embodiments, channel 252 can alternatively be defined in a cover plate mountable or mounted to a side surface 250 of spool 240. Channel 252 can include a channel end 252a and a channel end 252b having an entry area 252c.

Referring to FIGS. 3b-3e, in certain embodiments, switch 254 can include a manual mechanism 254m, a bottom frame 254f having a guide path 254g, a spring 254s disposed in guide path 254g, and a pin 254p having a head 254h disposed in guide path 254g. As shown in FIG. 3e, spring 254s, in its natural state, can apply a force to head 254h of pin 254p and can retain pin 254p on one side of guide path 254g. Referring to FIG. 3c, switch 254 can be disposed at a slot 203 such that movement of manual mechanism 254m, disposed on an external side of housing 201, can cause pin 254p, disposed on an internal side of housing 201, to traverse guide path 254g.

Figures 4A, 4B:
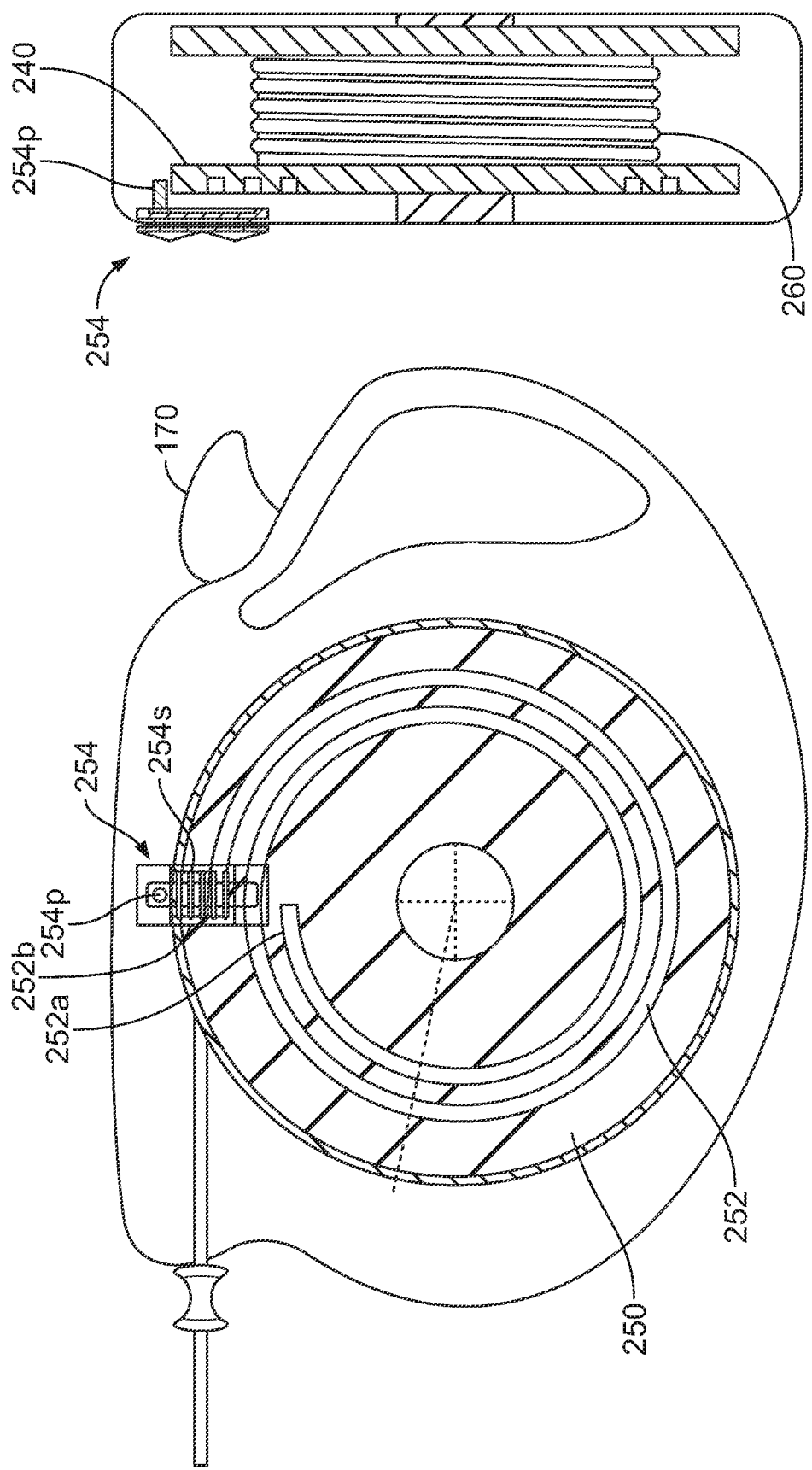

The following description of how exemplary leash device 200 can be operated to limit the extendable length of main line 260, without affecting retractability of the line, is made with reference to FIGS. 4a-8b. FIGS. 4a-8b illustrate an exemplary progressing interaction between switch 254 and channel 252 during extension and retraction of main line 260 from housing 201. In particular, FIGS. 4a and 4b are views of exemplary leash device 200, illustrating the interaction between switch 254 and channel 252, when switch 254 is in an unactuated state and main line 260 has not yet extended from housing 201. FIGS. 5a and 5b are views of leash device 200, illustrating the interaction between switch 254 and channel 252, when switch 254 is in an actuated state and main line 260 has not yet extended from housing 201. FIGS. 6a and 6b are views of leash device 200, illustrating the interaction between switch 254 and channel 252, when switch 254 is in the actuated state and a certain amount of main line 260 has extended from housing 201. FIGS. 7a and 7b are views of leash device 200, illustrating the interaction between switch 254 and channel 252, when switch 254 is in the actuated state and main line 260 has extended from housing 201 to a preset length defined by the length of channel 252 between channel ends 252a and 252b.

Figures 5A, 5B:
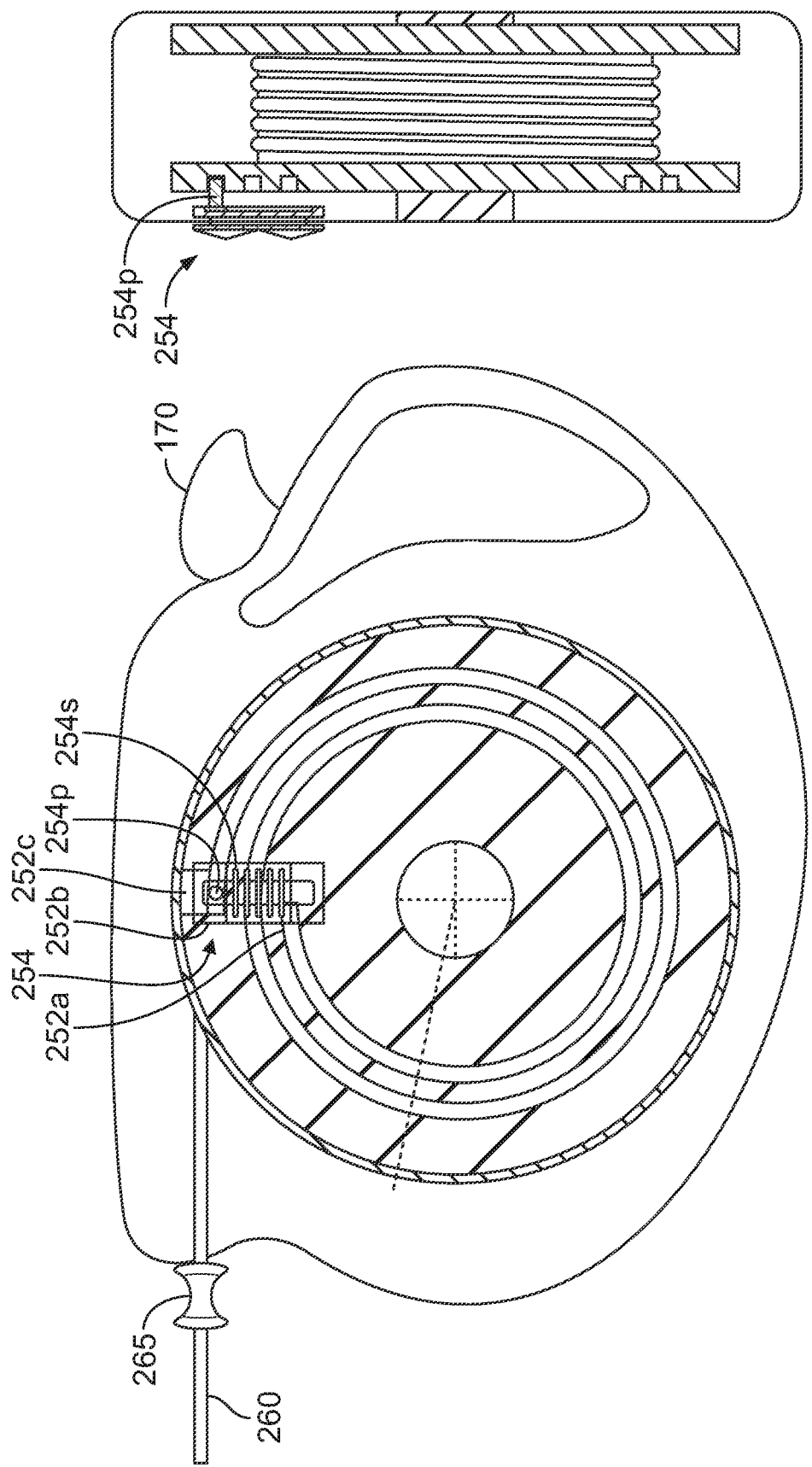
Figures 6A, 6B:
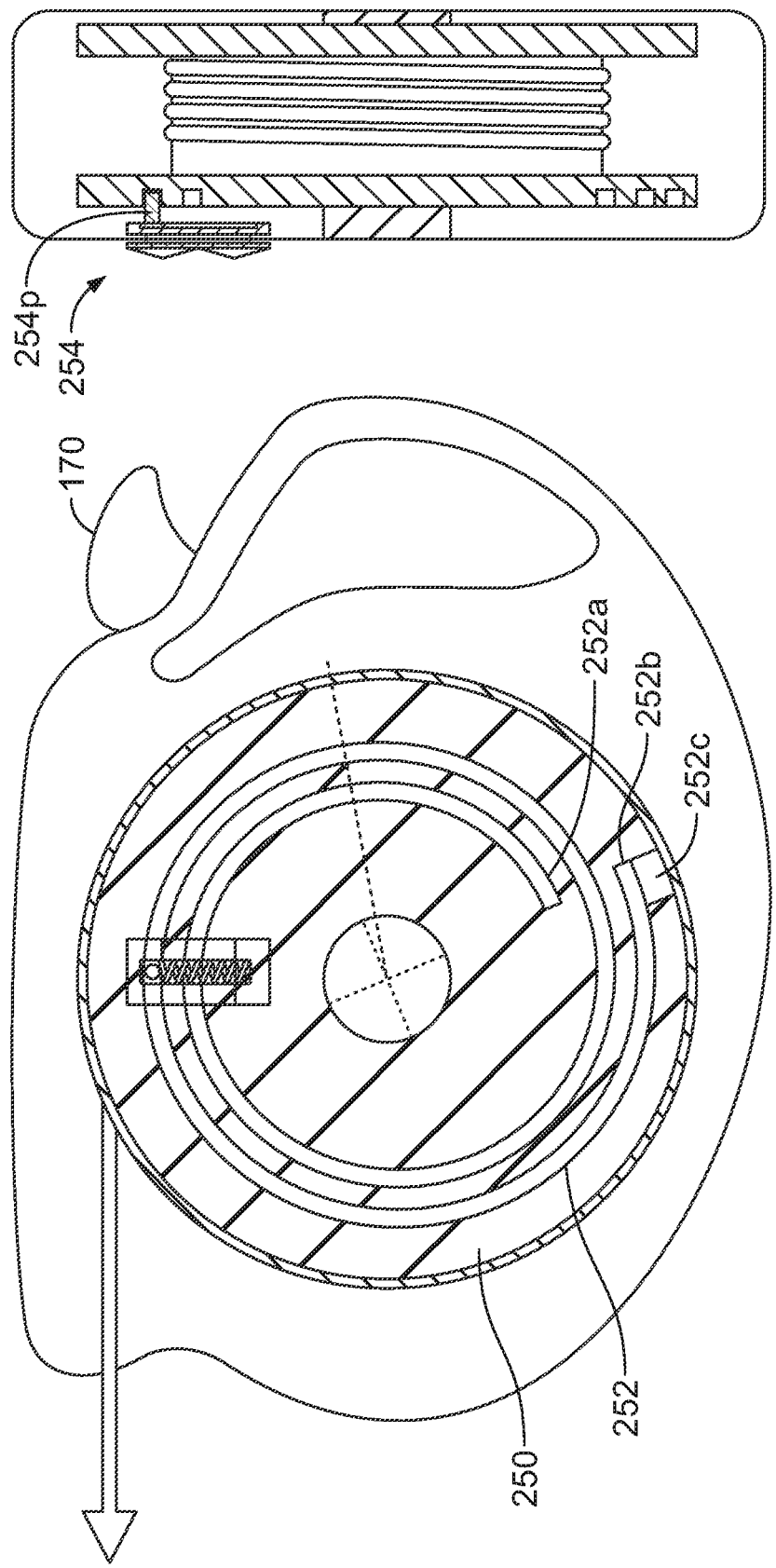
Figures 7A, 7B:
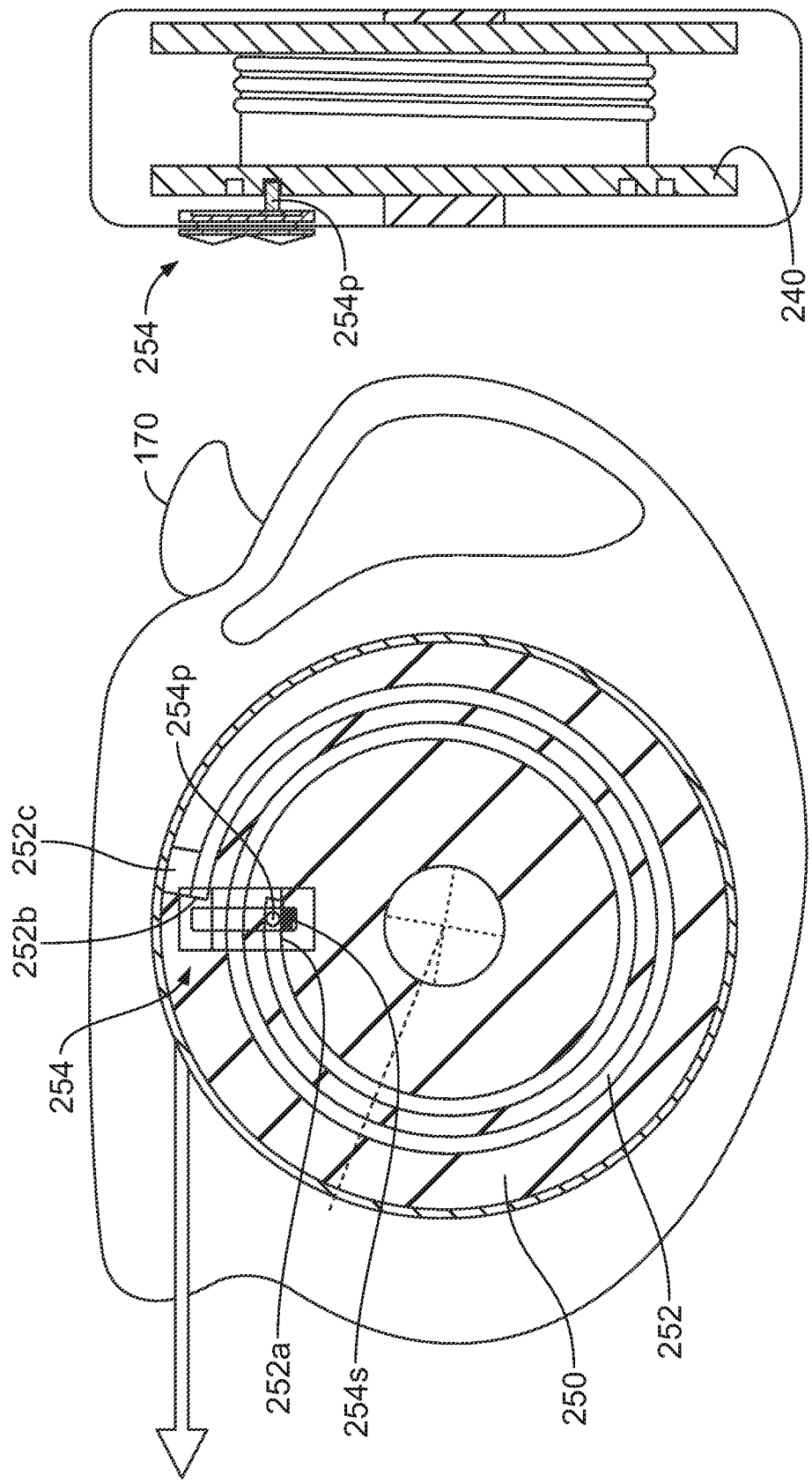
Figures 8A, 8B:
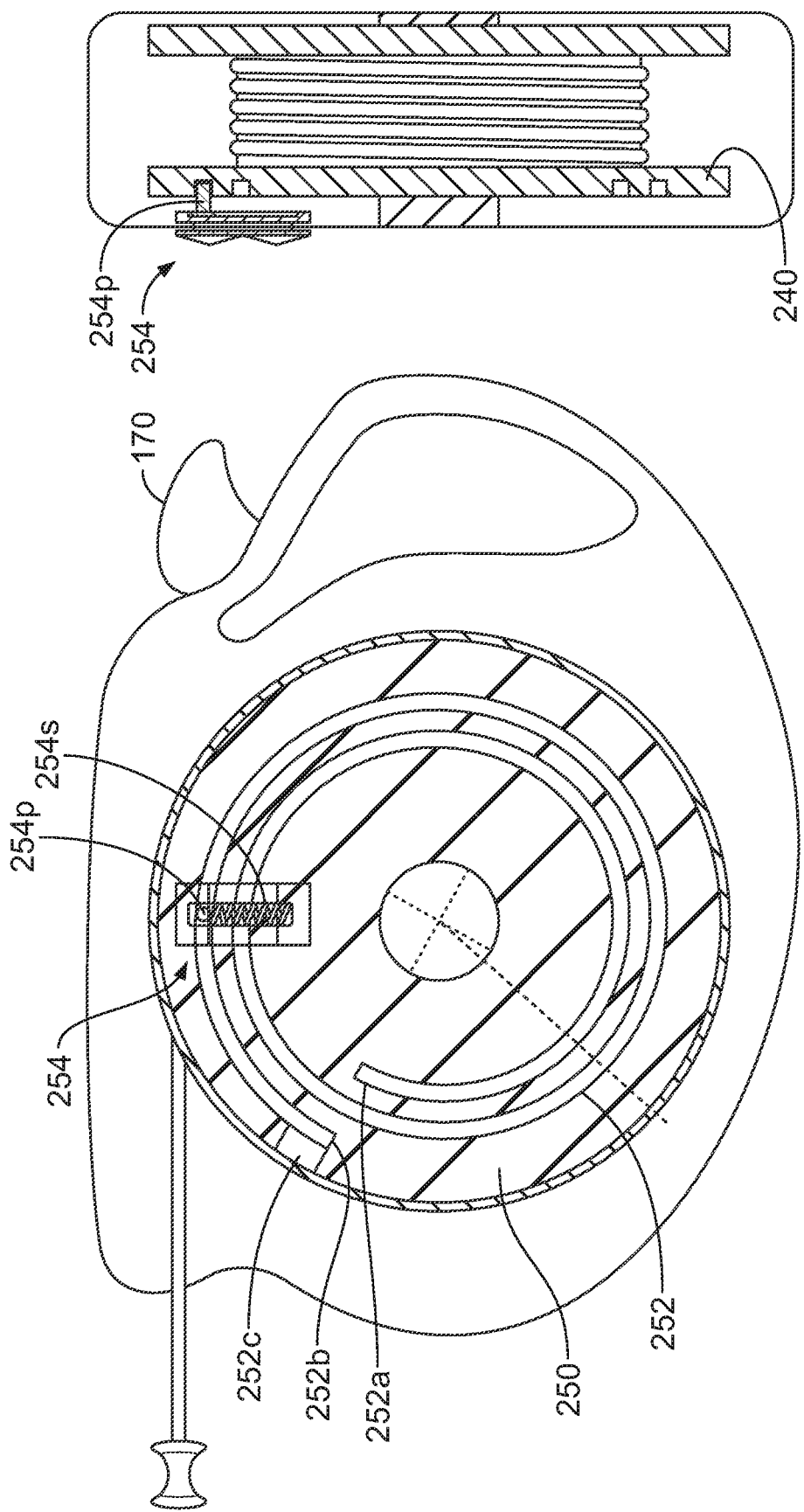

Referring to FIGS. 4a and 4b, switch 254 is shown in its unactuated state and main line 260 is fully coiled about spool 240. In this embodiment, spring 254s is in a relaxed state and applies force to pin 254p, retaining pin 254p at an upper portion of switch 254. In this position, no portion of pin 254p is in contact with channel 252. Next, when switch 254 is actuated (e.g., via user operation of manual mechanism, 254m), pin 254p can compresses spring 254s and enters entry area 252c at channel end 254b of channel 252 (FIGS. 5a and 5b). After pin 254p enters channel 252, any extension of main line 260 from housing 201 can cause the pin to traverse the channel. As a result, pin 254p can also compress spring 254s during the traversal. FIGS. 6a and 6b depict pin 254p having traversed to a position in channel 252 between channel ends 252b and 252a, after main line 260 has extended from housing 201 by a certain amount. As main line 260 continues to extend, pin 254p can continue to traverse channel 252 until it reaches channel end 252a. At this point (FIGS. 7a and 7b), pin 254p can fully compress spring 254s, traversal of pin 254p is halted, and further extension of main line 260 is restricted. In this way, the length control system of leash device 200 can restrict extendibility of main line 260 to a preset amount that is less than the full length of main line 260 (see FIG. 7b, where an amount of main line 160 remains coiled about spool 240). However, the system does not prohibit retractability of main line 260 from the state shown in FIGS. 7a and 7b, since release of main line 260 can allow a spring mechanism coupled to spool 240 to return to its relaxed state, and thus draw the main line back into housing 201 and around the spool. As main line 260 is retracted, spool 240, and thus channel 252, continues to rotate, allowing pin 254p to reverse its travel path from inner channel end 252a to outer channel end 252b. As pin 254p reverses its travel in channel 252, spring 254s can continually be decompressed. FIGS. 8a and 8b depict pin 254p having reversed its traversal of channel 252 to a position between channel end 252a and 252b.

FIG. 9a is a side view of an alternate exemplary retractable leash device 300, in accordance with various embodiments of the present technology. FIG. 9b is a top view of a switch 354 of leash device 300. FIGS. 9c and 9d are side views of switch 354. FIG. 9e is a bottom view of switch 354. FIG. 9f is a plan view of a side surface 350 of a wind-up spool 340 of leash device 300.

Exemplary leash device 300 can include a housing 301 having opposite housing sides, a wind-up spool 340, a main line 360, and a connector 365. In various embodiments, the length control system can include multiple channels 352a, 352b, and 352c, and a switch 354.

Referring to FIG. 9f, in certain embodiments, channels 352a-c can be defined in a side surface 350 of wind-up spool 340. However, in certain embodiments, channels 352a-c can alternatively be defined in a cover plate mountable or mounted to a side surface 350 of spool 340. Channels 352a-c can be connected to one another via a bridge 399. In certain embodiments, channel 352a can be circular, and channels 352b and 352c can be spiral-like. Given channel 352a's circular shape, it is merely a continuous circular path. Channel 352b can have a channel end b1 and a channel end b2, and channel 352c can have a channel end c1 and a channel end c2.

Referring to FIGS. 9b-9e, in certain embodiments, switch 354 can include a manual mechanism 354m, a bottom frame 354f having a guide path 354g, a spring 354s disposed in guide path 354g, and a pin 354p having a head 354h disposed in guide path 354g. As shown in FIG. 9e, spring 354s, in its natural state, can apply a force to head 354h of pin 354p and can retain pin 354p on one side of guide path 354g. Referring to FIG. 9c, in certain embodiments switch 354 is disposed at a slot 303 such that movement of manual mechanism 354m, disposed on an external side of housing 301, can cause pin 354p, disposed on an internal side of housing 301, to traverse guide path 354g.

The following description of how exemplary leash 300 can be operated to limit the extendable length of main line 360, without affecting retractability of the line, is made with reference to FIGS. 10a-12b. FIGS. 10a-12b illustrate the interaction between switch 354 and channels 352a-c during extension and retraction of main line 360 from housing 301. In particular, FIGS. 10a and 10b are views of leash device 300, illustrating the position of switch 354 with respect to bridge 399 and channel 352a, when switch 354 is in an unactuated state and main line 360 has not yet been extended from housing 301. In this position and in its unactuated state, any extension of main line 360 will merely cause pin 354p to traverse channel 352a in circles-channel 352a does not restrict the extension of the main line.

Figures 11A, 11B:
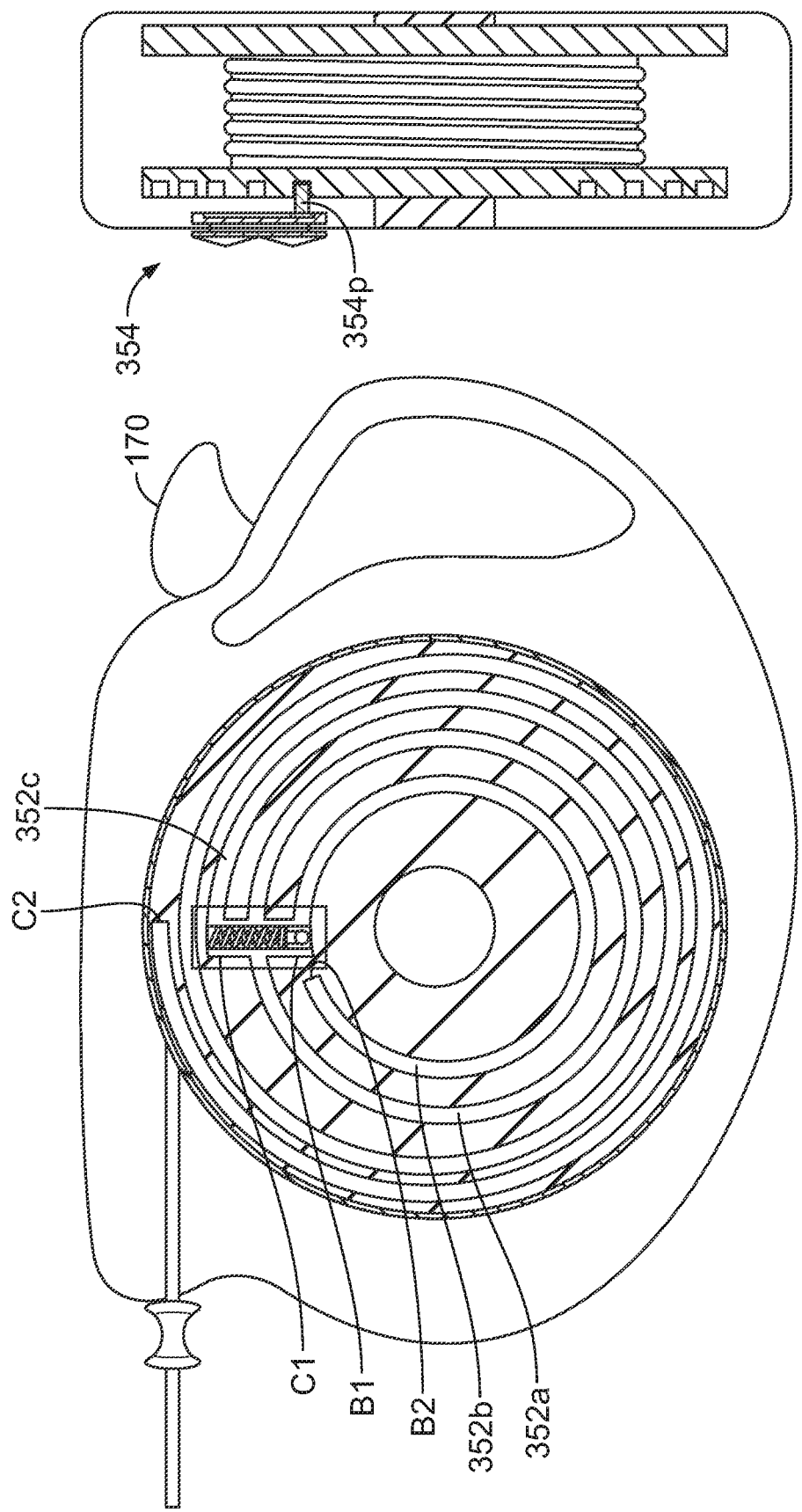

FIGS. 11a and 11b are views of leash device 300, illustrating the interaction between switch 354, bridge 399, and channel 352b, when switch 354 is in an actuated state in a direction –X, and main line 360 has not yet been extended from housing 301. When switch 354 is actuated in the –X direction and main line 360 is being extended, pin 354p applies a force to spring 354s in the +X direction and traverses channel 352b, beginning at end b1, until the pin reaches end b2. At this point, further extension of main line 360 is prevented. In this way, the length control system of leash device 300 can restrict extensibility of main line 360 to a preset amount that is less than the full length of main line 360. However, the system does not prohibit retractability of main line 360 when pin 354p is disposed at end b2, since release of main line 360 would allow a spring mechanism coupled to spool 340 to return to its relaxed state, and thus draw the main line back into housing 301 and around the spool. As main line 360 is retracted, spool 340, and thus channel 352b, continues to rotate, allowing pin 354p to reverse its travel path from end b2 to end b1. As pin 354p reverses its travel in channel 352b, spring 354s is continually relaxed.

Figures 12A, 12B:
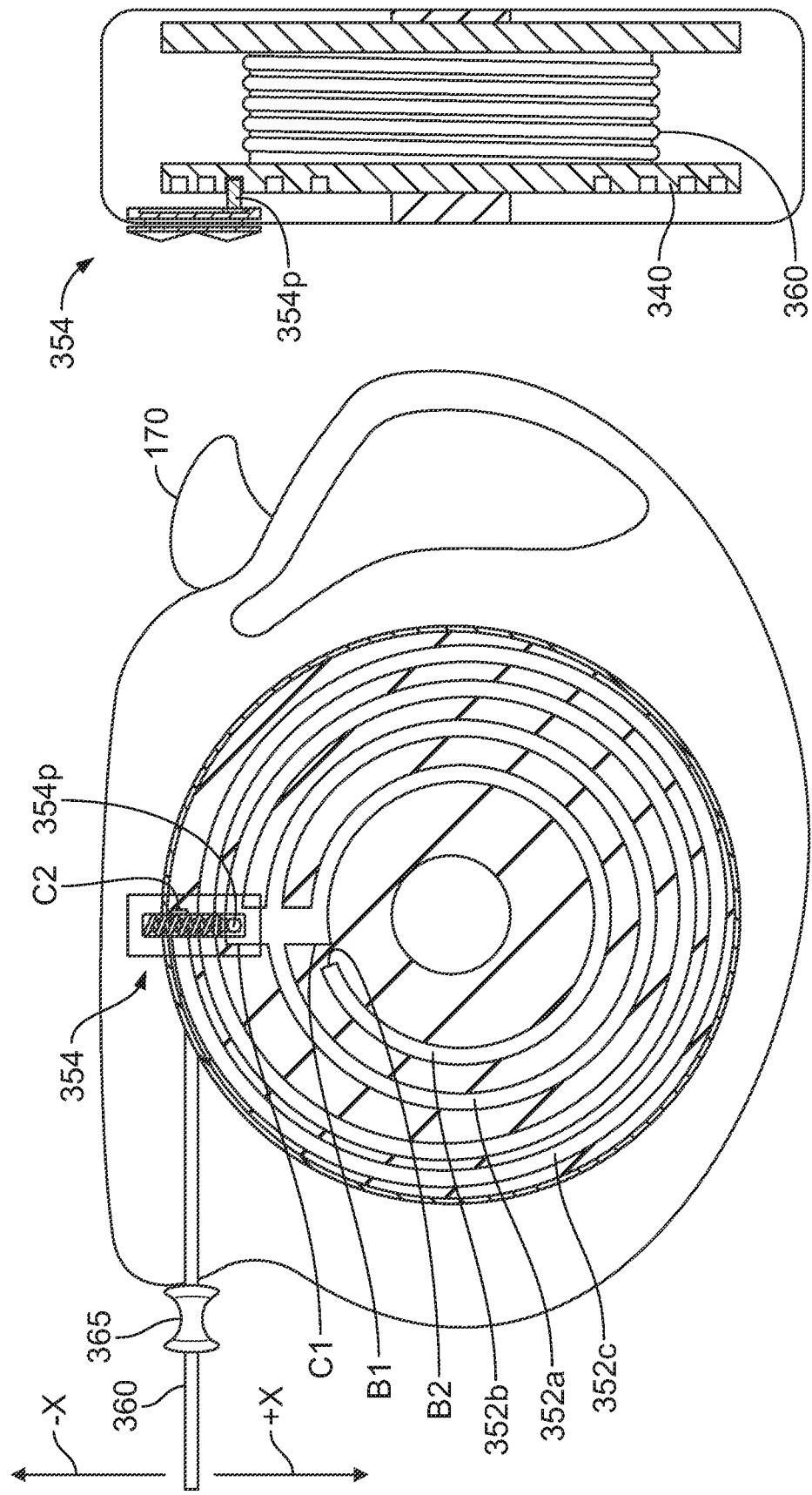

FIGS. 12a and 12b are views of leash device 300, illustrating the interaction between switch 354, bridge 399, and channel 352c, when switch 354 is in an actuated state in a direction +X, and main line 360 has not yet been extended from housing 301. When switch 354 is actuated in the +X direction and main line 360 is being extended, pin 354p applies a force to spring 354s in the +X direction and traverses channel 352c, beginning at end c1, until the pin reaches end c2. At end c2, further extension of main line 360 is prevented. However, because channel 352c is longer than 352b, the length control system of leash device 300 can restrict extendibility of main line 360 to a preset "intermediate" amount that is less than the full length of main line 360, but more than the preset length set by channel 352b. Additionally, the system does not prohibit retractability of main line 360 when pin 354p is disposed at end c2, since release of main line 360 would allow a spring mechanism coupled to spool 340 to return to its relaxed state, and thus draw the main line back into housing 301 and around the spool. As main line 360 is retracted, spool 340, and thus channel 352c, continues to rotate, allowing pin 354p to reverse its travel path from end c2 to end c1. As pin 354p reverses its travel in channel 352c, spring 354s is continually relaxed.

FIG. 13a is a side view of an alternate exemplary retractable leash device 400, in accordance with various embodiments of the present technology. FIG. 13b is a top view of a switch 454 of leash device 400. FIGS. 13c and 13d are side views of switch 454. FIG. 13e is a bottom view of switch 454. FIG. 13f is a plan view of a side surface 450 of a wind-up spool 440 of leash device 400.

Exemplary leash device 400 can include a housing 401 having opposite housing sides, a wind-up spool 440, a main line 460, and a connector 465. In various embodiments, the length control system can include multiple channels 452a, 452b, and 452c, and a switch 454. As illustrated in FIG. 13f, channel 452a is wider than the other channels. In certain embodiments, however, all the channels can have values within about 5% of each other.

Referring to FIG. 13f, channels 452a-c can be defined in a side surface 450 of wind-up spool 440. However, in certain embodiments, channels 452a-c can alternatively be defined in a cover plate mountable to a side surface 450 of spool 440. Channels 452a-c can be connected to one another via a bridge 499. Channel 452a can be circular, and channels 452b and 452c can be spiral-like. Given channel 452a's circular shape, it is merely a continuous circular path. Channel 452b can have a channel end d1 and a channel end d2, and channel 452c can have a channel end e1 and a channel end e2.

Referring to FIGS. 13b-13e, in certain embodiments, switch 454 can include a manual mechanism 454m, a bottom frame 454f having a guide path 454g, a spring 454s disposed in guide path 454g, and a pin 454p having a head 454h disposed in guide path 454g. As shown in FIG. 13e, spring 454s, in its natural state, can apply a force to the head of pin 454p and can retain pin 454p on one side of guide path 454g. Referring to FIG. 13c, in certain embodiments switch 454 is disposed at a slot 403 such that movement of manual mechanism 454m, disposed on an external side of housing 401, can cause pin 454p, disposed on an internal side of housing 401, to traverse guide path 454g.

In addition to pin 454p, switch 454 can include a second pin 554. Second pin 554 can, for example, have a head and a post. In certain embodiments, second pin 554 can be fixed in place relative to frame 454f. When manual mechanism 454m is moved, second pin 554 can, along with pin 454p, move in a corresponding manner or can move independently of each other.

The following description of how exemplary leash 400 can be operated to limit the extendable length of main line 460, without affecting retractability of the line, is made with reference to FIGS. 14a-16b. FIGS. 14a-16b illustrate the progressing interaction between switch 454 and channels 452a-c during extension and retraction of main line 460 from housing 401. In particular, FIGS. 14a and 14b are views of leash device 400, illustrating the position of switch 454 with respect to bridge 499 and channel 452a, when switch 454 is in an unactuated state and main line 460 has not yet been extended from housing 401. In this position and in its unactuated state, any extension of main line 460 will merely cause pin 454p and second pin 554 to traverse channel 452a in circles—channel 452a does not restrict the extension of the main line.

Figures 15A, 15B:
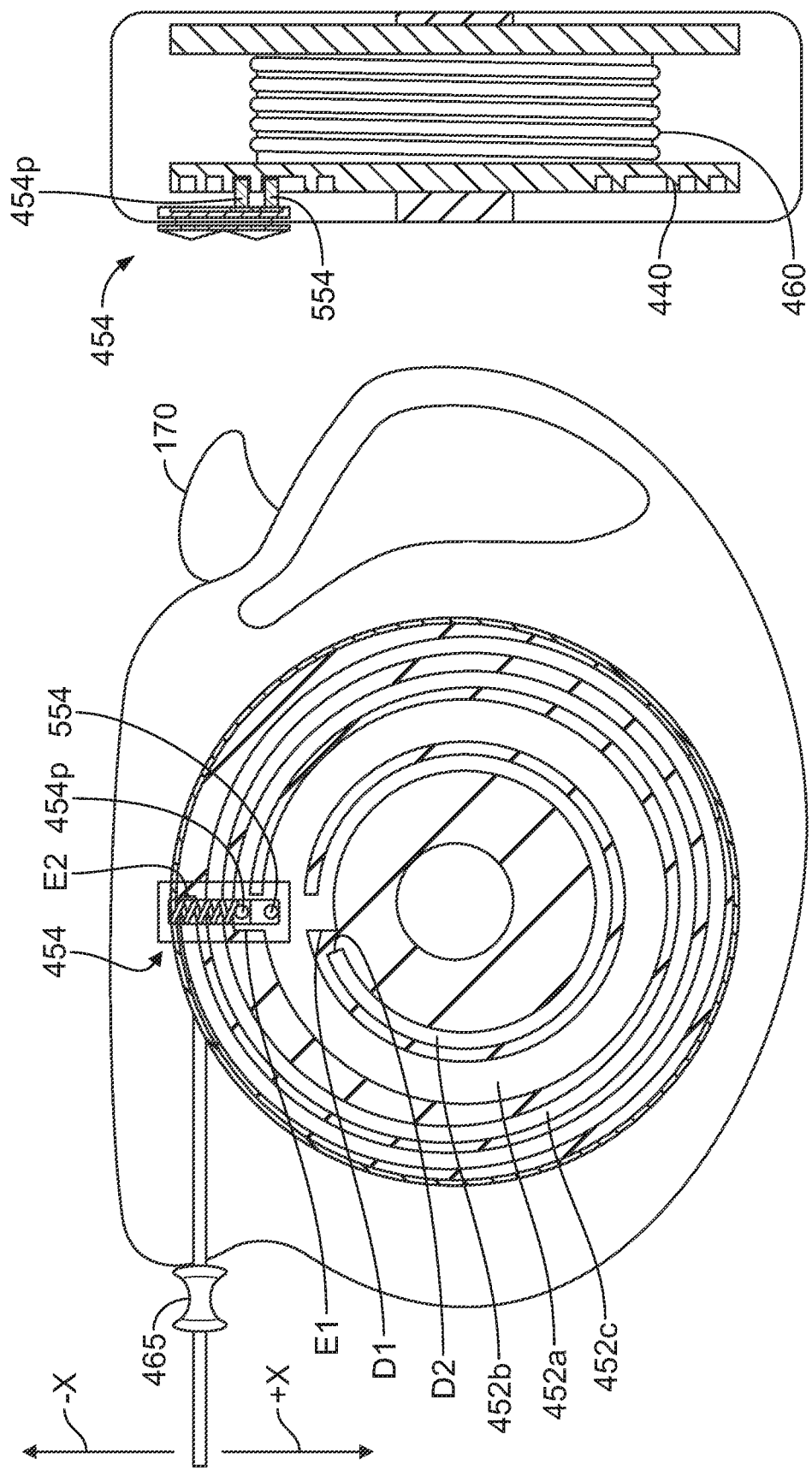

FIGS. 15a and 15b are views of leash device 400, illustrating the interaction between switch 454, bridge 499, and channel 452c, when switch 454 is in a first actuated state in a direction +X, and main line 460 has not yet been extended from housing 401. When switch is actuated in the +X direction and main line 460 is being extended, pin 454p applies a force to spring 454s in the +X direction and traverses channel 452c, beginning at end e1, until the pin reaches end e2. At this point, further extension of main line 460 is prevented. During this time, second pin 554 remains in channel 452a and traverses the channel in circles. In this way, the length control system of leash device 400 can restrict extensibility of main line 460 to a preset amount that is less than the full length of main line 460. However, the system does not prohibit retractability of main line 460 when pin 454p is disposed at end e2, since release of main line 460 would allow a spring mechanism coupled to spool 440 to return to its relaxed state, and thus draw the main line back into housing 401 and around the spool. As main line 460 is retracted, spool 440, and thus channel 452c, continues to rotate, allowing pin 454p to reverse its travel path from end e2 to end e1. As pin 454p reverses its travel in channel 452b, spring 454s is continually relaxed.

Figures 16A, 16B:
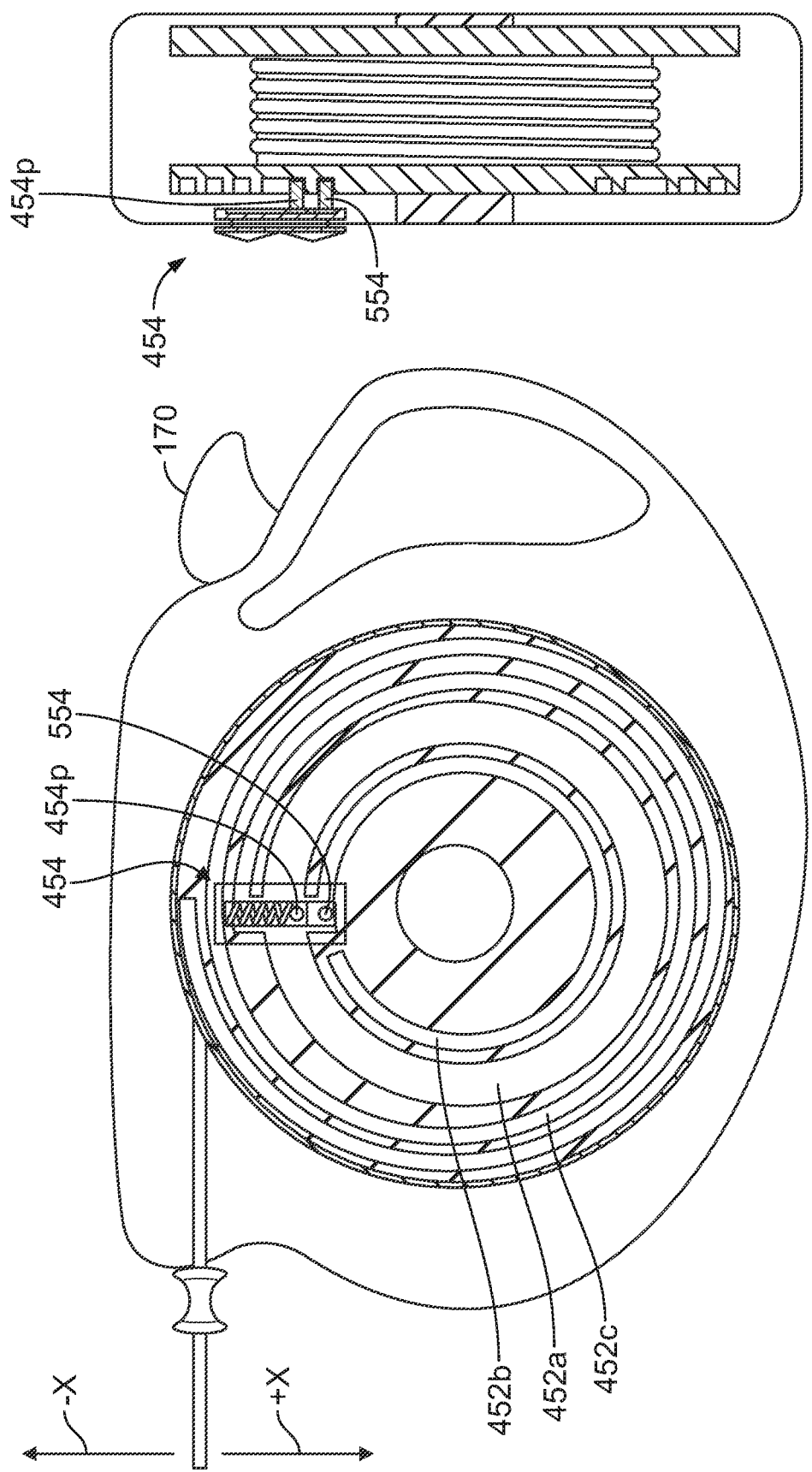

FIGS. 16a and 16b are views of leash device 400, illustrating the interaction between switch 454, bridge 499, and channel 452c, when switch 454 is in a second actuated state in a direction −X, and main line 460 has not yet been extended from housing 401. When switch 454 is actuated in the −X direction, second pin 554 enters channel 452b and pin 454p remains in channel 452a. When main line 460 is being extended, second pin 554 traverses channel 452b, beginning at end d1, until the pin reaches end d2. At this point, further extension of main line 460 is prevented. Because channel 452b is shorter than 452c, the length control system of leash device 400 can restrict extendibility of main line 460 to an amount less than full length of main line 460 and less than the preset length set by channel 452c. Additionally, the system does not prohibit retractability of main line 460 when second pin 554 is disposed at end d2, since release of main line 460 would allow a spring mechanism coupled to spool 440 to return to its relaxed state, and thus draw the main line back into housing 401 and around the spool. As main line 460 is retracted, spool 440, and thus channel 452b, continues to rotate, allowing second pin 554 to reverse its travel path from end d2 to end d1. In certain embodiments, second pin 554 can remain in channel 452b until manual mechanism 454m is displaced in the +X direction.

In certain embodiments, channels 454a and 454b can be separate from channel 454c, with no portion bridging channel 454c to the other the channels. In these embodiments, second pin 554 can be a separate component from switch 454, and can be insertable into and retrievable from channel 452b through slot 403 as desired by a user.

FIGS. 17A, 17B, 18A, 18B, 19A, and 19B depict embodiments of the leash device with channel 504 comprising spring 503. Spring 503 is permitted to lie in any portion of the channel. In these embodiments, the channel 504 is formed as a space between and adjacent to the spiral piece 509 which curves outward from the center of the spool. In these embodiments, a perimeter path is defined as the space between the outermost edge of channel 504 and the periphery of wind-up spool 140 (for example, as shown in FIG. 2A). In these embodiments, the perimeter path is disposed concentrically within the spool.

Figure 17A:
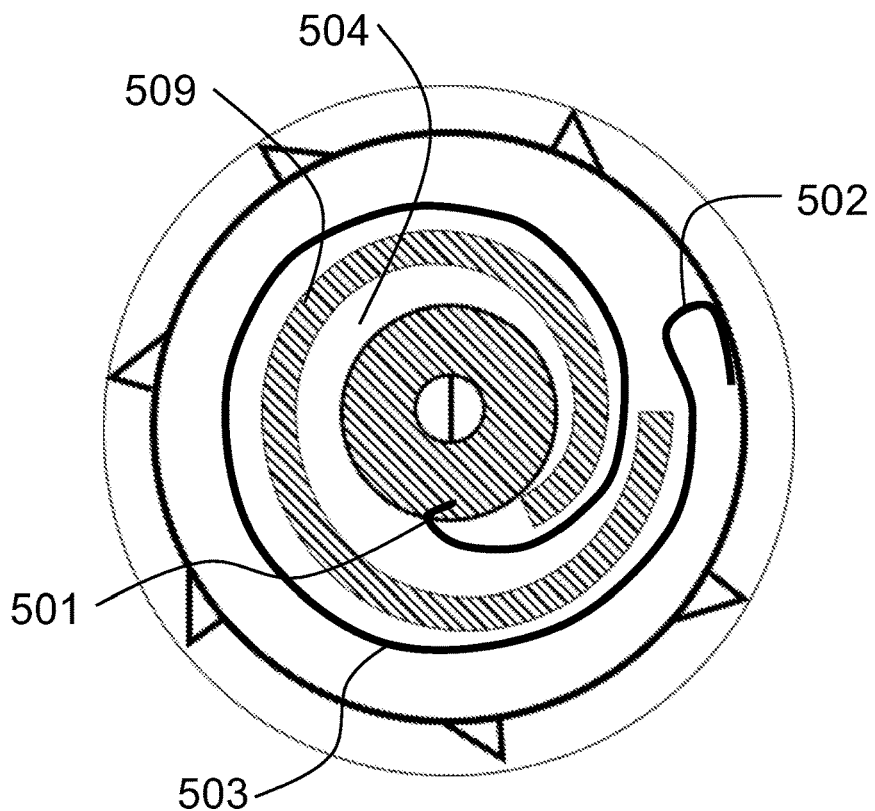
FIG. 17A is a plan view of a side surface of a wind-up spool of a retractable leash device with a channel and a spring, in accordance with various embodiments of the present technology.
Figure 17B:
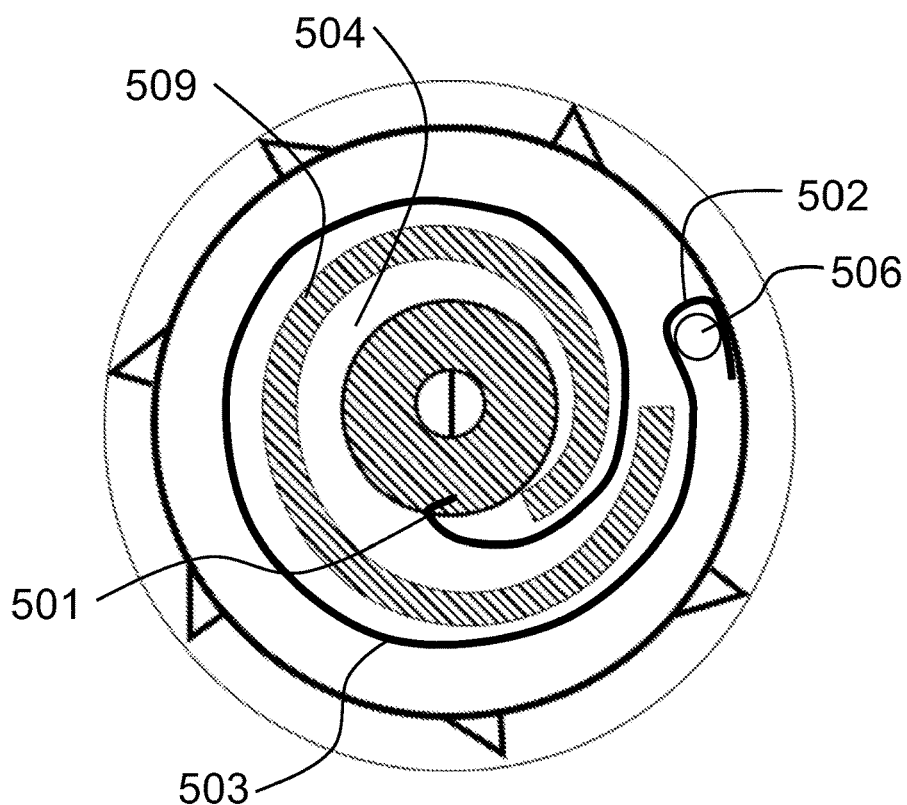
FIG. 17B is a plan view of a side surface of a wind-up spool of a retractable leash device with a channel and spring, illustrating the interaction between a pin and a spring during extension and retraction of a main line, in accordance with various embodiments of the present technology.

In certain embodiments, such as in FIG. 17A, the first end of the spring 503 is attached to the center portion of the spool 501. The spring 503 can be disposed through a portion of the channel 504 and the second end of spring 503 curves in on itself to form a hook shape and lies in the perimeter path. As wind-up spool 140 (as shown, e.g., in FIG. 2A) moves, the second end of the spring 503 moves throughout the perimeter path. In certain embodiments, such as in FIG. 17B, the pin 506 can selectively engage the perimeter path by contacting the second end of the spring 503 at a point of contact 502 and coming to a stop, thereby stretching the spring until the spring tightens to a maximum length, at which point the spring comes to a stop. Methods and forms of attachment of the spring and center of the spool include, but are not limited to, crimping, gluing, fastening, nailing, puncture, magnet or adhesive.

Figure 18A:
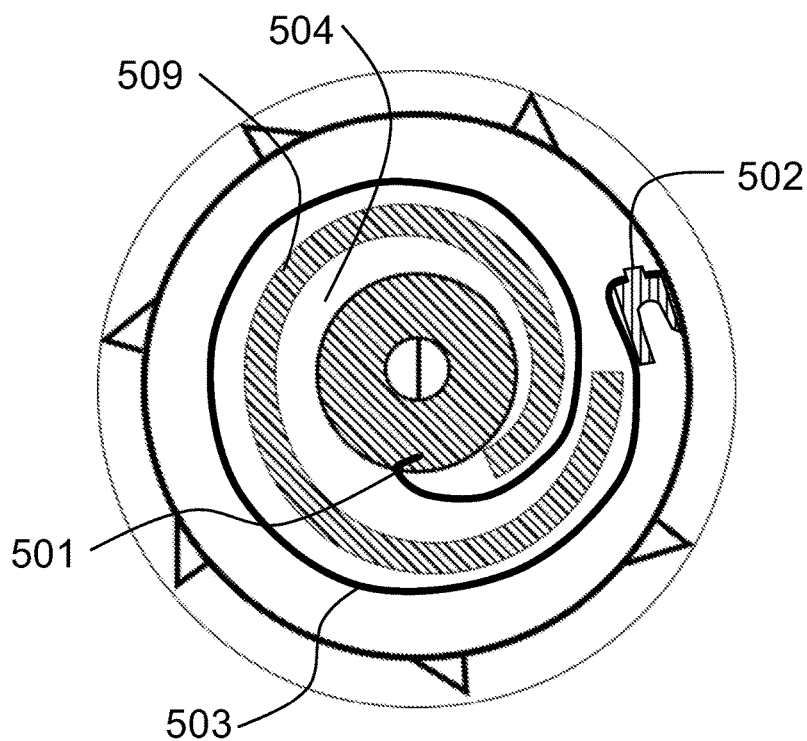
FIG. 18A is a plan view of a side surface of a wind-up spool of a retractable leash device with a channel, a spring, and a clip, in accordance with various embodiments of the present technology.
Figure 18C:
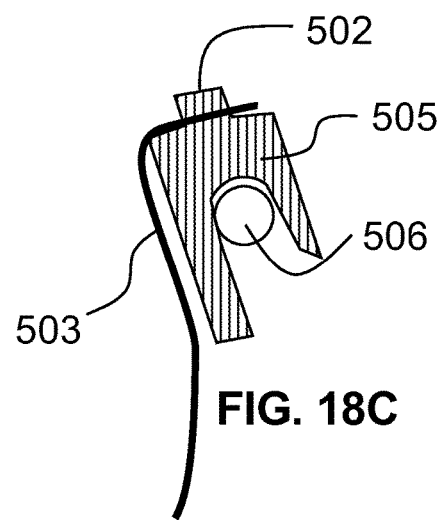
FIG. 18C is a side view of a pin, clip, and spring of a retractable leash device, in accordance with various embodiments of the present technology.
Figure 18B:
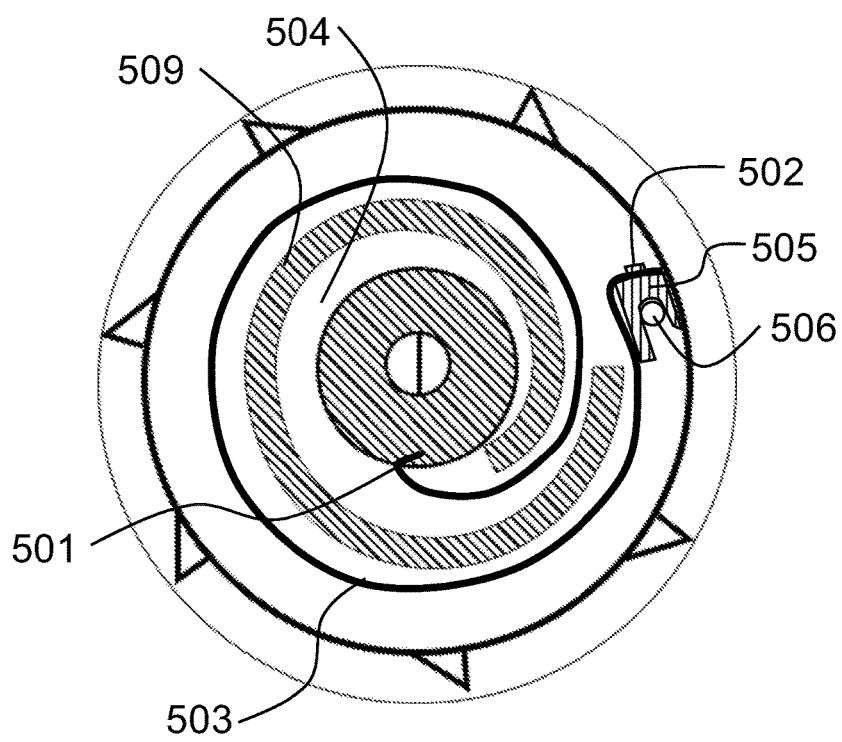
FIG. 18B is a plan view of a side surface of a wind-up spool of a retractable leash device with a channel, a spring, and a clip, illustrating the interaction between a pin, clip, and spring during extension and retraction of a main line, in accordance with various embodiments of the present technology.

FIGS. 18A-C depict a view of embodiments of the leash device where the second end of spring 503 is attached to clip 505 at point 502 within the perimeter path. Methods and forms of attachment of the spring and clip, or the spring and center of the spool include, but are not limited to, crimping, gluing, fastening, nailing, puncture, magnet or adhesive. Clip 505 serves as reinforcement and further support for Pin 506. In certain embodiments, pin 506 is movable to selectively engage the clip 505 within the perimeter path, restricting the movement of the clip along the perimeter path, thereby stretching the spring 503 until the spring tightens to a maximum length, at which point the spring comes to a stop.

In certain embodiments, such as in shown in FIG. 18A, the first end of the spring 503 is attached to the center portion of the spool 501. The spring 503 can be disposed through a portion of the channel 504. The second end of the spring is attached to clip 505 residing in the perimeter path at point 502 (shown in greater detail in FIG. 18C). Methods and forms of attachment of the spring and clip, or the spring and center of the spool include, but are not limited to, crimping, gluing, fastening, nailing, puncture, magnet or adhesive. As wind-up spool 140 (as shown, e.g., in FIG. 2A) moves, the second end of the spring 503 and clip 505 to which it is attached move throughout the perimeter path. In certain embodiments, such as in FIG. 18B, the clip is fixed within the perimeter path. Movement of the pin 506 causes the pin to engage with the clip 505, and restricts the movement of the clip along the perimeter path, thereby stretching the spring 503 until the spring tightens to a maximum length, at which point the spring comes to a stop. In various embodiments, the pin 506 contacts only the clip 505 and not the spring 503, or both the clip 505 and the spring 503.

In certain embodiments, a cover plate 150 similar to FIG. 2A for the inner part of the spool is present. This can be the case for all embodiments herein; that is, any device herein can either include or not include a cover plate.

Figure 19A:
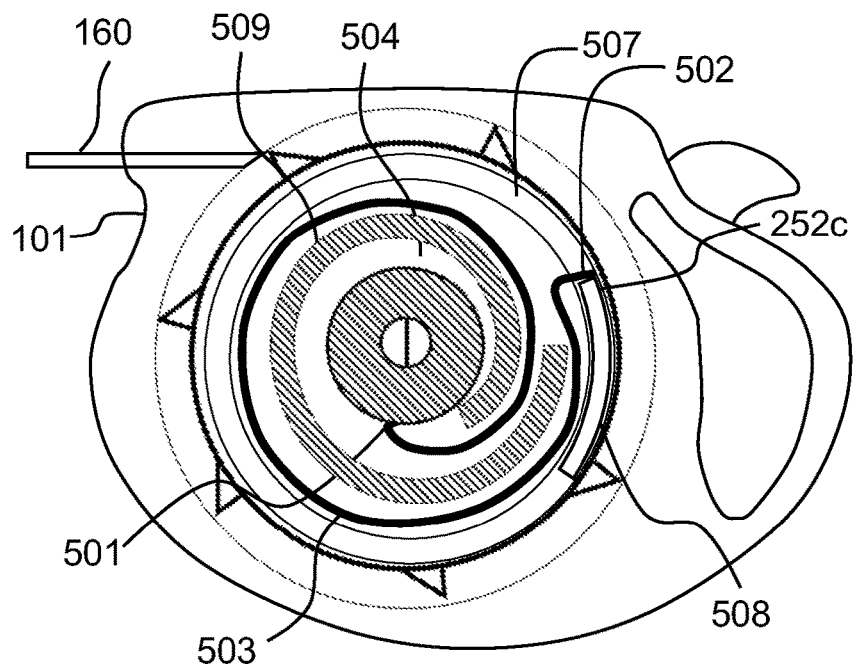
FIG. 19A is a plan view of a side surface of a wind-up spool of a retractable leash device with a channel, a spring, and a ring containing a hollowed-out section, in accordance with various embodiments of the present technology.
Figure 19C:
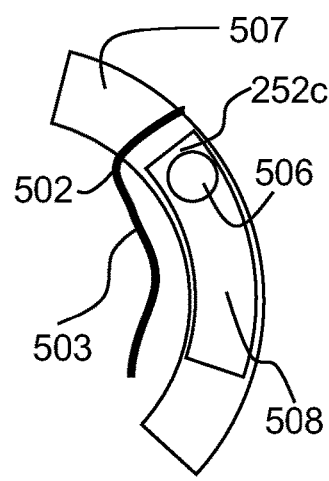
FIG. 19C is a side view of a portion of a ring containing a hollowed-out section, illustrating the interaction between a pin, a spring, and a hollowed-out section of a ring, in accordance with various embodiments of the present technology.
Figure 19B:
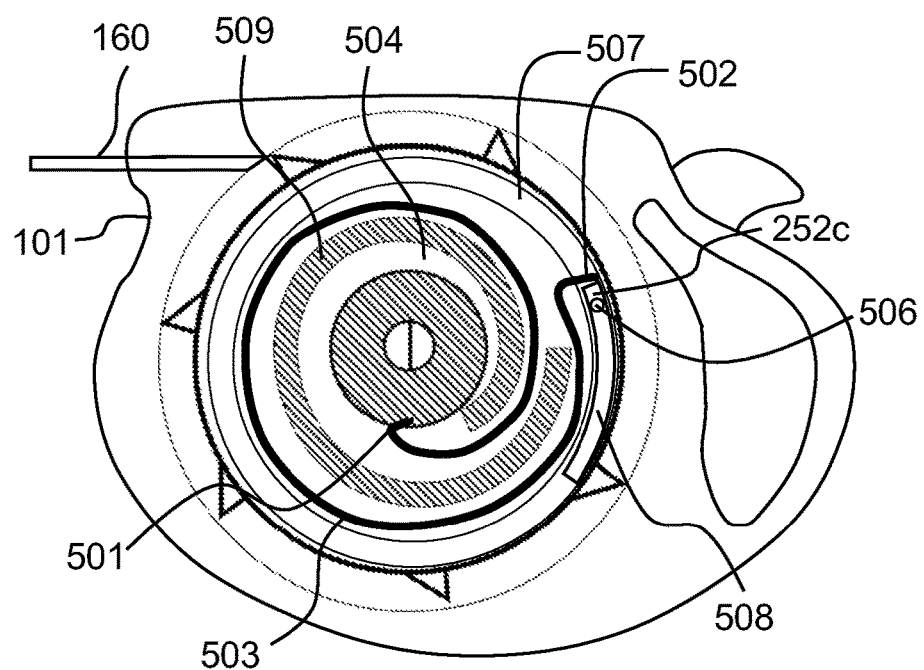
FIG. 19B is a plan view of a side surface of a wind-up spool of a retractable leash device with a channel, a spring, and a ring containing a hollowed-out section, illustrating the interaction between a pin and a hollowed-out section of a ring, in accordance with various embodiments of the present technology.

In certain embodiments, the circumference of the perimeter path comprises a rotating ring to which the second end of the spring is attached, such that movement of the rotating ring tightens and loosens the spring. FIGS. 19A-C depict a view of embodiments of the leash device where the second end of spring 503 is attached to rotating ring 507 at point 502 within the perimeter path. Methods of attachment include, but are not limited to, crimping, gluing, fastening, nailing, puncture, or adhesive. Rotating ring 507 can be viewed as a circular extension of clip 505 (as shown, e.g., in FIGS. 18B and 18C). In certain embodiments, a portion of the rotating ring is a hollowed-out groove; in other embodiments, pin 506 is configured to contact the hollowed-out groove. In certain embodiments, pin 506 is movable to selectively engage rotating ring 507, specifically within hollowed-out groove 508 within the perimeter path, restricting the movement of the rotating ring along the perimeter path, thereby stretching the spring 503 until the spring 503 tightens to a maximum length, at which point the spring 503 comes to a stop.

In certain embodiments, such as shown in FIG. 19A, the first end of the spring 503 is attached to the center portion of the spool 501. The spring 503 can be disposed through a portion of the channel 504. The perimeter path comprises a rotating ring 507, wherein a portion of the rotating ring is hollowed-out groove 508. The rotating ring 507 can be viewed as a circular extension of clip 505 providing reinforcement and further support for pin 506. Rotating ring 507 can be made of various materials including, but not limited to, plastic. The second end of spring 503 is attached to the rotating ring 507 at point 502 (shown in greater detail in, e.g., FIG. 19C). Methods of attachment include, but are not limited to, crimping, gluing, fastening, nailing, puncture, or adhesive. As wind-up spool 140 (FIG. 2A) moves, the rotating ring 507 rotates. In certain embodiments, for example as shown in FIGS. 19A-C, the pin 506 can sit above the plane of the hollowed-out groove 508 such that it is not engaged within, but can move orthogonally downward into the plane of the hollowed-out groove such that it is engaged within, and slides back and forth within the hollowed-out groove during use of the leash device. In certain embodiments, such as in FIG. 19B, the movement of the pin 506 within hollowed-out groove 508 causes the rotating ring to tighten and loosen the spring. In various embodiments, the pin 506 contacts only the hollowed-out groove 508 and not the spring 503, or both the hollowed-out groove 508 and spring 503.

FIGS. 17A, 17B, 18A, 18B, 19A, and 19B depict a method of restricting the movement of a human or animal, for example, a child. In certain embodiments, these methods comprise the steps of attaching a leash device containing a leash control system described herein to the human or animal; and engaging the switch in the channel to select a predetermined maximum length of the main line.

Accordingly, embodiments of the retractable leash device advantageously limits the extendable length of the main line, without affecting its retractability.

It will thus be seen that the aspects, features and advantages made apparent from the foregoing are efficiently attained and, since certain changes may be made without departing from the spirit and scope of the technology, it is intended that all matter contained herein shall be interpreted as illustrative and not in a limiting sense.

What is claimed is:

1. A leash length control system comprising:
   (a) a spool comprising (i) two opposing surfaces, substantially parallel to each other and rotatable around an axis, and (ii) a center portion joining the two surfaces;
   (b) a main line coiled around the center portion of the spool and extendable and retractable;
   (c) a channel defined on one of the two surfaces, the channel comprising an entry portion and a spiral portion;
   (d) a spring having a first end attached to the center portion of the spool and a second end opposite the first end, the spring being disposed through a portion of the length of the channel such that the spring is stretched and tightened within the channel to control the length of extension of the mainline;
   (e) a perimeter path encompassing the space between the outermost edge of the spiral and the periphery of the spool and disposed concentrically within the spool; and
   (f) a pin movable to selectively engage and move within the perimeter path, causing the spring to stretch to a predetermined maximum length desired and set by the user.

2. The system of claim 1, wherein the second end of the spring contacts the perimeter path, such that the pin can advance along the perimeter path to a point where the pin contacts the second end of the spring, thereby stretching the spring until the spring tightens to a maximum length, at which point the pin and spring come to a stop.

3. The system of claim 1, wherein the second end of the spring is connected to a clip located in the perimeter path, the clip configured to engage the pin such that movement of the pin advances the clip along the perimeter path, thereby stretching the spring until the spring tightens to a maximum length, at which point the pin and spring come to a stop.

4. The system of claim 1, wherein the circumference of the perimeter path comprises a rotating ring to which the second end of the spring is attached, such that movement of the rotating ring tightens and loosens the spring.

5. The system of claim 4, wherein a portion of the rotating ring is a hollowed-out groove.

6. The system of claim 5, wherein the pin is configured to contact the hollowed-out groove.

7. A length control system comprising:
   (a) a spool comprising (i) two opposing surfaces, substantially parallel to each other and rotatable around an axis, and (ii) a center portion joining the two surfaces;
   (b) a cover plate mounted to one of the two surfaces of the spool;
   (c) a main line coiled around the center portion of the spool and extendable and retractable;
   (d) a channel defined on the cover plate, the channel comprising an entry portion and a spiral portion;
   (e) a spring having a first end attached to the center portion of the spool and a second end opposite the first end and disposed along a portion of the length of the channel;
   (f) a perimeter path encompassing the space between the outermost edge of the spiral and the periphery of the spool and disposed concentrically within the spool; and
   (g) a pin movable to selectively engage the perimeter path by contacting the second end of the spring at a point of contact and coming to a stop, thereby stretching the spring until the spring tightens to a maximum length, at which point the spring comes to a stop.

8. The system of claim 7, wherein the second end of the spring contacts the perimeter path, such that the pin can advance along the perimeter path to a point where the pin contacts the second end of the spring, thereby stretching the spring until the spring tightens to a maximum length, at which point the spring comes to a stop.

9. The system of claim 7, wherein the second end of the spring is connected to a clip located in the perimeter path, and movement of the pin selectively engages the clip within the perimeter path, thereby stretching the spring until the spring tightens to a maximum length, at which point the spring comes to a stop.

10. The system of claim 7, wherein the circumference of the perimeter path comprises a rotating ring to which the second end of the spring is attached, such that movement of the rotating ring tightens and loosens the spring.

11. The system of claim 10, wherein a portion of the rotating ring is a hollowed-out groove.

12. The system of claim 11, wherein the pin is configured to contact the hollowed-out groove.

13. A retractable leash device, comprising:
a housing; and
a length control system enclosed within the housing, the length control system comprising:
(a) a spool comprising (i) two surfaces, substantially parallel to each other and rotatable around an axis, and (ii) a center portion joining the two surfaces;
(b) a main line coiled around the center portion of the spool and extendable and retractable;
(c) a channel defined on one of the two surfaces or on a cover plate mounted on one of the two surfaces, the channel comprising an entry portion and a spiral portion;
(d) a spring having a first end attached to the center portion of the spool and a second end opposite the first end of the spring, the spring being disposed through a portion of the length of the channel such that the spring is stretched and tightened within the channel to control the length of extension of the mainline;
(e) a perimeter path encompassing the space between the outermost edge of the spiral and the periphery of the spool and disposed concentrically within the spool; and
(f) a pin movable to selectively engage and move within the perimeter path, causing the spring to stretch to a predetermined maximum length desired and set by the user.

14. A method of restricting the movement of a human or animal comprising the steps of:
attaching a leash device containing the leash control system of claim 1 to the human or animal; and
engaging the switch in the channel to select a predetermined maximum length of the main line.

15. A method of restricting the movement of an animal or a human comprising the steps of:
attaching a leash device containing the leash control system of claim 7 to the human or animal; and
engaging the switch in the channel to select a predetermined maximum length of the main line.

* * * * *